(12) United States Patent
Chapman et al.

(10) Patent No.: US 9,647,574 B2
(45) Date of Patent: May 9, 2017

(54) MULTI-STAGE POWER INVERTER

(71) Applicant: SunPower Corporation, San Jose, CA (US)

(72) Inventors: Patrick Chapman, Austin, TX (US); Andrew O'Connell, Austin, TX (US); Timothy Sams, Austin, TX (US); Eric Martina, Houston, TX (US)

(73) Assignee: SunPower Corporation, San Jose, CA (US)

(*) Notice: Subject to any disclaimer, the term of this patent is extended or adjusted under 35 U.S.C. 154(b) by 0 days.

(21) Appl. No.: 14/714,891

(22) Filed: May 18, 2015

(65) Prior Publication Data
US 2015/0249405 A1 Sep. 3, 2015

Related U.S. Application Data

(63) Continuation of application No. 13/095,190, filed on Apr. 27, 2011, now Pat. No. 9,065,354.

(51) Int. Cl.
H02M 3/335 (2006.01)
H02M 7/5387 (2007.01)
H02J 3/38 (2006.01)
H02M 7/48 (2007.01)
H02M 1/08 (2006.01)

(52) U.S. Cl.
CPC ........ *H02M 7/53871* (2013.01); *H02J 3/383* (2013.01); *H02M 1/08* (2013.01); *H02M 3/33507* (2013.01); *H02M 7/4807* (2013.01); *Y02E 10/563* (2013.01)

(58) Field of Classification Search
USPC ............ 323/906; 307/82; 363/16–17, 39–41, 363/44–46, 65, 131, 132
See application file for complete search history.

(56) References Cited

U.S. PATENT DOCUMENTS

| 2005/0125709 | A1* | 6/2005 | McKim et al. | 714/25 |
| 2011/0026282 | A1* | 2/2011 | Chapman et al. | 363/65 |
| 2011/0058398 | A1* | 3/2011 | Agbossou et al. | 363/74 |

* cited by examiner

Primary Examiner — Adolf Berhane
Assistant Examiner — Nusrat Quddus
(74) Attorney, Agent, or Firm — Barnes & Thornburg LLP

(57) ABSTRACT

An inverter for converting an input direct current (DC) waveform from a DC source to an output alternating current (AC) waveform for delivery to an AC grid includes an input converter, an output converter, an input controller, and an output controller. The input controller is configured to control the operation of the input converter, and the output controller is configured to control the operation of the output controller. The input and output controllers are electrically isolated from each other and may be incapable of direct communications between each other. In some embodiments, the input and output controllers may communicate with each other via the input and output converters.

20 Claims, 21 Drawing Sheets

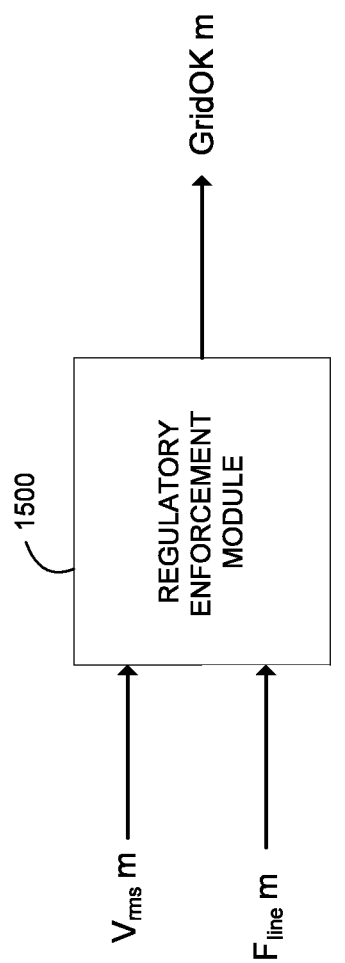

MULTI-STAGE POWER INVERTER

CROSS-REFERENCE TO RELATED U.S. PATENT APPLICATION

This is a continuation application of U.S. patent application Ser. No. 13/095,190, entitled "Multi-State Power Inverter for Power Bus Communication," which was filed on Apr. 27, 2011, the entirety of which is hereby incorporated by reference.

TECHNICAL FIELD

The present disclosure relates, generally, to power converters for converting direct current (DC) power to alternating current (AC) power and, more particularly, to devices, systems, and methods for converting DC power to AC power suitable for supplying energy to an AC grid and/or an AC load.

BACKGROUND

Power inverters convert a DC power to an AC power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

In photovoltaic applications, the power delivered by each photovoltaic cell may vary in magnitude over time due to temporal variations in operating conditions including changes in sunlight intensity, angle of incidence of sunlight, ambient temperature and other factors. As such, photovoltaic cells have an operating point at which the values of the current and voltage of the cell result in an ideal or "maximum" power output. This "maximum power point" ("MPP") is a function of environmental variables, including light intensity and temperature. Inverters for photovoltaic systems may include some form of maximum power point tracking ("MPPT") as a mechanism of identifying and tracking the maximum power point ("MPP") and adjusting the inverter to exploit the full power capacity of the cell at the MPP.

Additionally, in a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

Typical photovoltaic inverters include an inverter circuit for converting DC power to AC power and a controller for controlling the functionality of the inverter circuit. Some inverter circuits include an input stage and an output stage. Typical inverter controllers are embodied as single stage controllers. That is, a single inverter controller controls both the input stage and the output stage of the inverter circuit.

SUMMARY

According to one aspect, an inverter for converting direct current (DC) power from a DC source to alternating current (AC) power may include an input converter, and output converter, an input controller, and an output controller. The input converter may be electrically coupled to a power bus and configured to convert an input DC waveform to a bus waveform supplied to the power bus. The output converter may be electrically coupled to the power bus and configured to convert the bus waveform to an output AC waveform. The input controller may be electrically coupled to the input converter and configured to control the operation of the input converter. The output controller may be separate from the input controller and may be electrically coupled to the output converter. Additionally, the output controller may be configured to control the operation of the output converter.

In some embodiments, the input controller may be incapable of directly communicating with the output controller. Additionally or alternatively, the input controller and the output controller may communicate with each other only via the power bus. In such embodiments, the input controller may include a first communication module and the output controller may include a second communication module. The first and second communication module may be configured to communicate with each other over the power bus.

In some embodiments, the DC source may be embodied as a photovoltaic (PV) module and the input controller may include a maximum power point tracking (MPPT) module configured to control the input converter to draw a maximum amount of power from the PV module. Additionally, the input converter may include a sense resistor electrically coupled to the PV module and the input controller includes a current sense circuit electrically coupled to the sense resistor and configured to generate a first signal indicative of a current output of the PV module. The input controller may also include a voltage sense circuit electrically coupled to the PV module and configured to generate a second signal indicative of a voltage output of the PV module.

In some embodiments, the input converter may include a first inverter circuit electrically coupled to the DC source, a transformer having a primary winding electrically coupled to the first inverter circuit, a rectifier circuit electrically coupled to a secondary winding of the transformer and to the power bus, and a voltage sense circuit electrically coupled to an output of the rectifier circuit and configured to generate a signal indicative of a voltage of the power bus. In such embodiments, the power bus may be embodied as a DC bus and the bus waveform may be a first DC waveform. Additionally, the first inverter circuit may be configured to convert the input DC waveform to a first AC waveform at a first frequency based on switching signals received from the input controller, the transformer may be configured to convert the first AC waveform to a second AC waveform at the first frequency, and the rectifier circuit may be configured to rectify the second AC waveform to produce the first DC waveform.

Additionally, in some embodiments, the input converter may comprise an isolated boost converter electrically connected to the DC source and the first inverter circuit. Additionally or alternatively, the input converter may comprise an active voltage clamp circuit electrically coupled to the isolated boost converter and the first inverter circuit. In some embodiments, the input controller is powered by the DC power source. For example, the input controller may include an internal power supply that generates an output voltage based on a sensed voltage of the DC power source.

In some embodiments, the output converter may include an inverter circuit electrically coupled to the power bus and configured to convert the bus waveform to the output AC waveform. In such embodiments, the output controller may be configured to generate switching signals to the inverter circuit to control the operation of the inverter circuit. Additionally, the output controller may include a first voltage sense circuit electrically coupled to the power bus and may be configured to generate a first signal indicative of a voltage of the power bus. Additionally, the output controller may also include a bus voltage control module configured to control the voltage of the power bus by generating a duty cycle for the switching signals based on the first signal and an average power bus voltage value. Further, in some embodiments, the output converter may be electrically coupled to an AC grid and further include a current sense circuit electrically coupled to an output of the inverter circuit to sense an output current of the inverter circuit. In such embodiments, the output controller may include a pulse width modulation module configured to generate the switching signals based on the sensed output current of the inverter circuit. Additionally, in some embodiments, the output converter may be electrically coupled to an AC grid and include an internal power supply electrically coupled to the AC grid. The output controller may also include a power line communication circuitry configured to communicate with a remote device over an AC power line in some embodiments.

According to another aspect, an apparatus may include a solar panel and an inverter. The solar panel may include a solar cell configured to generate a first direct current (DC) waveform in response to receiving an amount of sunlight. The inverter may be coupled to the solar cell panel and configured to receive the first DC waveform and convert the first DC waveform to an output alternating current (AC) waveform. The inverter may include an input converter electrically coupled to a power bus and configured to convert the first DC waveform to a bus waveform supplied to the power bus, an output converter electrically coupled to the power bus and configured to convert the bus waveform to the output AC waveform, an input controller electrically coupled to the input converter and configured to control the operation of the input converter, and an output controller separate from the input controller and electrically coupled to the output converter. The output controller may be configured to control the operation of the output converter.

In some embodiments, the input controller may be incapable of directly communicating with the output controller. For example, in some embodiments, the input controller may include a first communication module and the output controller may include a second communication module. In such embodiments, the first and second power line communication modules are configured to communicate with each other over the power bus.

In some embodiments, the input converter may include a sense resistor electrically coupled to an output of the solar panel and the input controller may include (i) a current sense circuit electrically coupled to the sense resistor and configured to generate a first signal indicative of a current output of the solar panel and (ii) a voltage sense circuit electrically coupled to the output of the solar panel and configured to generate a second signal indicative of a voltage output of the solar panel.

Additionally, in some embodiments, the input converter may include a first inverter circuit electrically coupled to an output of the solar panel, a transformer having a primary winding electrically coupled to the first inverter circuit, a rectifier circuit electrically coupled to a secondary winding of the transformer and to the power bus. In such embodiments, the input controller may include a voltage sense circuit electrically coupled to an output of the rectifier circuit and configured to generate a signal indicative of a voltage of the power bus. In some embodiments, the input controller may include an internal power supply that generates an output voltage based on a sensed voltage of the solar panel.

In some embodiments, the output converter may include an inverter circuit electrically coupled to the power bus and configured to convert the bus waveform to the output AC waveform. In such embodiments, the output controller may be configured to generate switching signals to the inverter circuit to control the operation of the inverter circuit. The output controller may also include a first voltage sense circuit electrically coupled to the power bus and configured to generate a first signal indicative of a voltage of the power bus and a bus voltage control module configured to control the voltage of the power bus by generating a duty cycle for the switching signals based on the first signal and an average power bus voltage value. In some embodiments, the output converter is electrically coupled to an AC grid, the output controller comprising an internal power supply electrically coupled to the AC grid. Additionally, in some embodiments, the output controller further comprises a power line communication circuitry configured to communicate with a remote device over an AC power line.

According to another aspect, an inverter may include a direct current (DC) bus, an input converter, an output converter, an input controller and an output controller galvanically isolated from the input controller. The input converter may be electrically coupled to the DC bus and may include a transformer having a primary winding and a secondary winding and a first inverter circuit electrically coupled to the primary winding and configured to convert an input DC waveform to a first alternating current (AC) waveform at the primary winding based on a plurality of first switching signals. The transformer may be configured to convert the first AC waveform to a second AC waveform. The input converter may also include a rectifier circuit electrically coupled to the secondary winding and the DC bus. The rectifier circuit may be configured to rectify the second AC waveform to produce a second DC waveform on the DC bus.

The output converter may be electrically coupled to the DC bus and may include a second inverter circuit electrically coupled to the DC bus and configured to convert the second DC waveform to an output AC waveform suitable for delivery to an AC grid based on a plurality of second switching signals. The input controller may be electrically coupled to the input converter to control the operation of the input converter. The input controller may generate the first switching signals. The output controller may be electrically coupled to the output converter to control the operation of the output converter and may generate the second switching signals. In some embodiments, the input controller and the output controller may be incapable of directly communicating data signals between each other.

DESCRIPTION OF THE DRAWINGS

FIG. 19 is a simplified schematic of one embodiment of a regulatory circuit of the output controller of FIG. 17;

DETAILED DESCRIPTION

Figure 1:
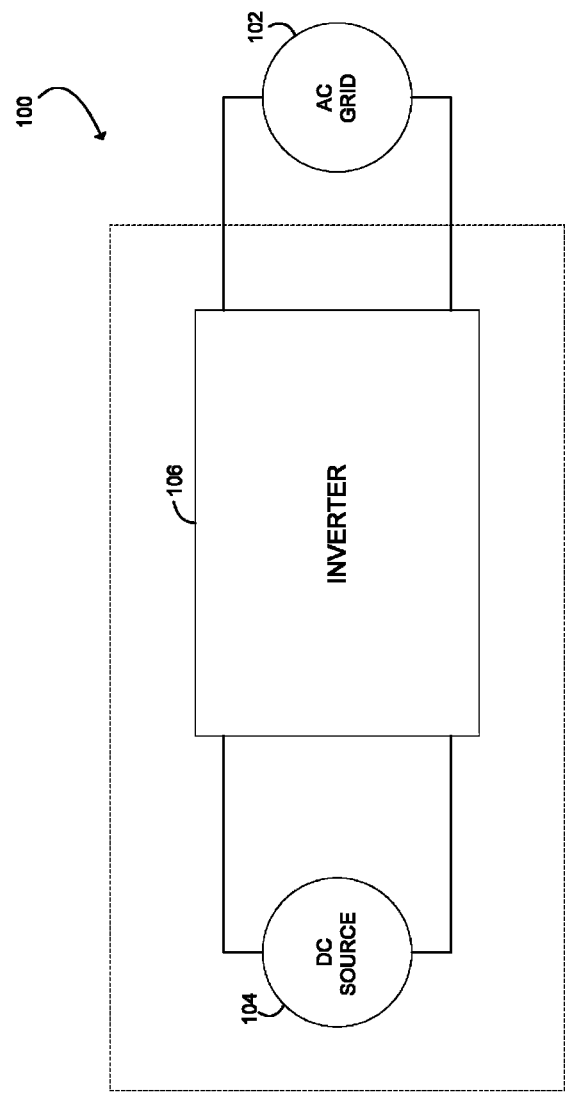
FIG. 1 is a simplified block diagram of one embodiment a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC source 104 may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., $f=\omega/2\pi=50$ Hz or 60 Hz).

Figure 2:
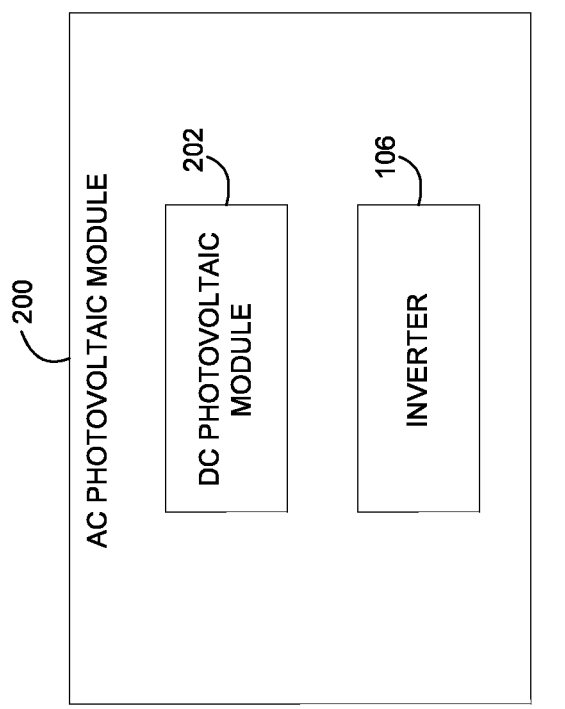
FIG. 2 is a simplified block diagram one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other so as to embody an AC photovoltaic module (ACPV) 200 as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202. As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
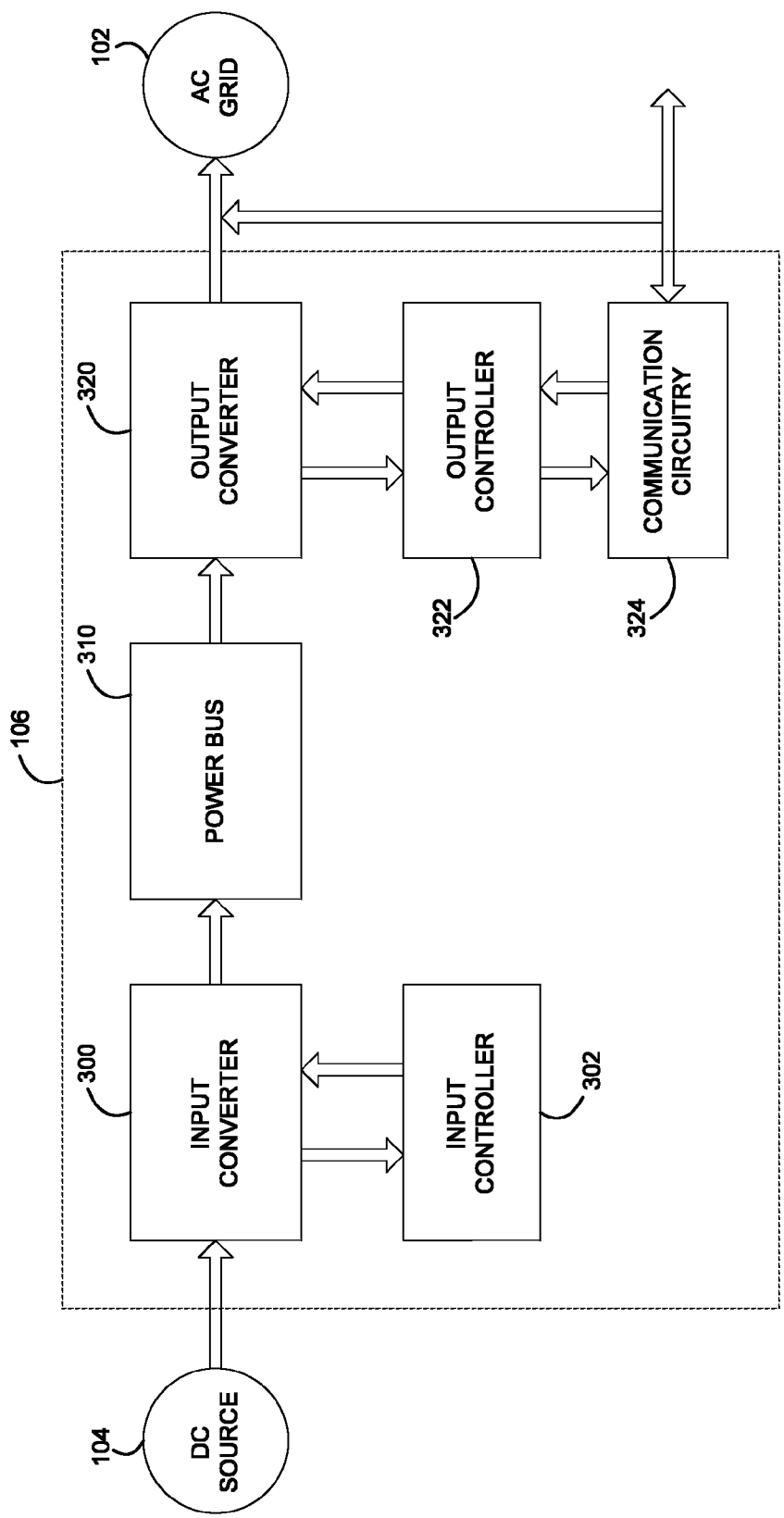
FIG. 3 is a simplified block diagram of one embodiment of an inverter of the system of FIG. 1.

Referring now to FIG. 3, in one embodiment, the inverter 106 includes an input converter 300, a power bus 310, and an output converter 320. The input converter 300 is electrically coupled to the power bus 310 and is electrically couplable to the DC source 104 as shown in FIG. 3. Similarly, the output converter 320 is electrically coupled to the power bus 310 and electrically couplable to the AC grid 102. The inverter 106 also includes an input controller 302 and an output controller 322. It should be appreciated that the output controller 322 is separate from the input controller 302. That is, although the controllers 302, 322 may be housed in a single housing, the circuitry of the controllers 302, 322 are separate from each other. For example, the input controller 302 and the output controller 322 may be implanted on separate, individual semiconductor chips or the like. Additionally, as discussed in more detail below, it should be appreciated that the input controller 302 and the output controller 322 are galvanically isolated from each other. Further, it should be appreciated that such separation and isolation between the controllers 302, 322 may lower the overall output noise of the inverter.

Because the controllers 302, 322 are separated and isolated from each other as discussed above, the controllers 302, 322 may be incapable of direct communications between each other. That is, the controllers 302, 322 may be incapable of directly communicating from one controller 302, 322 to the other controller 302, 322 without the use of intervening devices or circuitry. However, in some embodiments as discussed below, the controllers 302, 322 may be configured to communicate with each over the power bus 310. For example, the input controller 332 may be configured to modulate data onto the waveform of the power bus 310, which is subsequently demodulated by the output controller 322.

Additionally, in some embodiments, the inverter 106 may include communication circuitry 324. The communication circuitry 324 may be communicatively coupled to the output controller 322 or may be incorporated therein in some embodiments. The output controller 322 may utilize the communication circuitry 324 to communicate with remote devices, such as remote controllers or servers. In one particular embodiment, the communication circuitry 324 is embodied as a power line communication circuit configured to communicate with remote devices over an AC power line, such as the AC power line interconnects coupled to the output of the output converter 320. However, in other embodiments, other communication technologies and/or protocols may be used. For example, in some embodiments, the communication circuitry 324 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

In use, the input converter 300 of the inverter 106 is configured to be electrically coupled to the DC source 104 to receive a DC waveform therefrom. The input converter 300 converts the DC waveform to a bus waveform, which in the illustrative embodiment is a DC waveform but may be an AC waveform in other embodiments. Similarly, the output converter 320 is configured to be electrically coupled to the AC grid 102 and convert the bus waveform (i.e., either a DC waveform or an AC waveform) to the output AC waveform at the grid frequency for delivery to the AC grid 102.

As discussed above, the input controller 302 is electrically coupled to the input converter 300 and configured to control the operation of the input converter 300 to convert the input DC waveform from the DC source 104 to a bus waveform (e.g., a DC bus waveform) at the power bus 310. To do so, the input controller 302 may provide a plurality of switching and/or control signals to various circuits of the input converter 300 as described in more detail below. Additionally, as discussed below, the input controller 302 may control the operation of the input converter 300 based on a maximum power point tracking ("MPPT") algorithm or methodology.

The output controller 322 is electrically coupled to the output converter 320 and configured to control the operation of the output converter 320 to convert the bus waveform to the output AC waveform suitable for delivery to the AC grid 102. In the illustrative embodiment as discussed in more detail below, the output controller 322 is configured to use a pulse width modulation algorithm to control the output converter 320 such that the output AC waveform is pulse width modulated. To do so, the output controller 322 may provide a plurality of switching and/or control signals to various circuits of the output converter 320 as described in more detail below.

Figure 4:
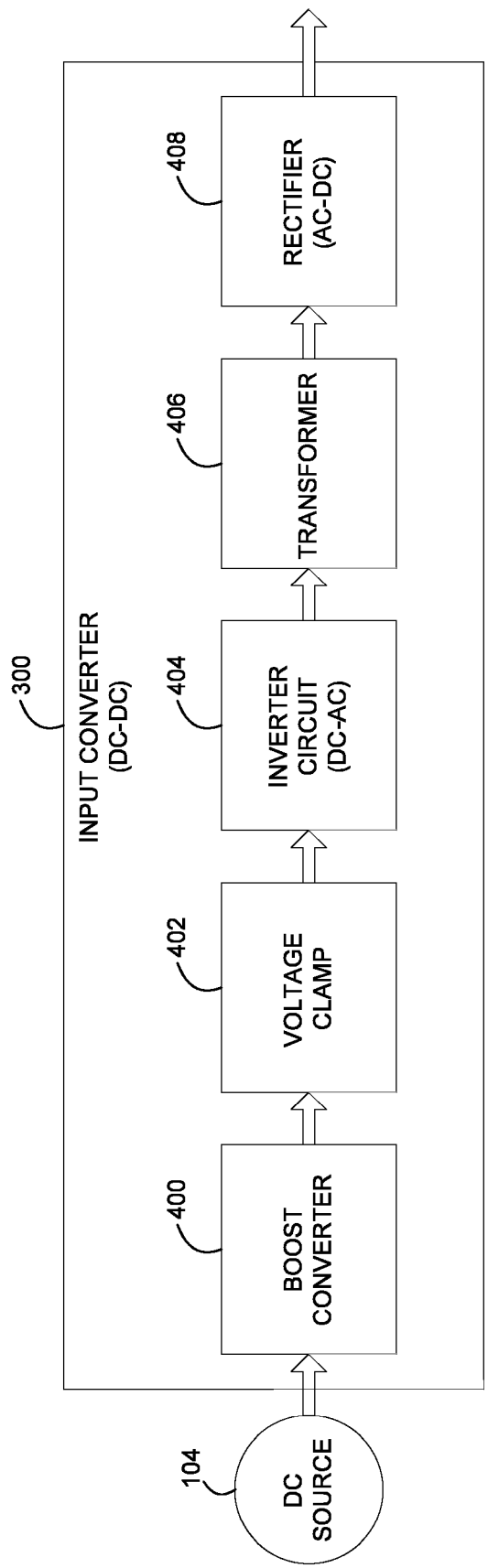
FIG. 4 is a simplified block diagram of one embodiment of an input converter of the inverter of FIG. 3.

Referring now to FIG. 4, in the illustrative embodiment, the input converter 300 is embodied as a DC-to-DC converter. The input converter 300 includes a boost converter 400, a voltage clamp 402, an inverter circuit 404, a transformer 406, and a rectifier 408. The boost converter 400 is embodied as an isolated boost converter and is electrically coupled to the voltage clamp 402 and the inverter circuit 404. The voltage clamp 402 is embodied as an active voltage clamp configured to clamp the voltage of the inverter circuit 404 to a predetermined maximum value based on a switching signal, $q_{IC5}$. The inverter circuit 404 is embodied as a DC-to-AC inverter circuit configured to convert the DC waveform supplied by the DC source 104 to an AC waveform delivered to a primary coil of the transformer 406. The transformer 406 may be embodied as a two or more winding transformer having a primary winding electrically coupled to the inverter circuit 404 and a secondary winding coupled to the rectifier 408. The transformer 406 is configured to convert the first AC waveform supplied by the inverter circuit 404 at the primary winding to a second AC waveform at the secondary winding. The first and second AC waveforms may have substantially equal frequency and may or may not have substantially equal voltages. Additionally, the transformer 406 provides galvanic isolation between the controllers 302, 322. The rectifier circuit 408 is electrically coupled to the secondary winding of the transformer 406 and configured to rectify the second AC waveform to a DC waveform supplied to the power bus 310.

Figure 5:
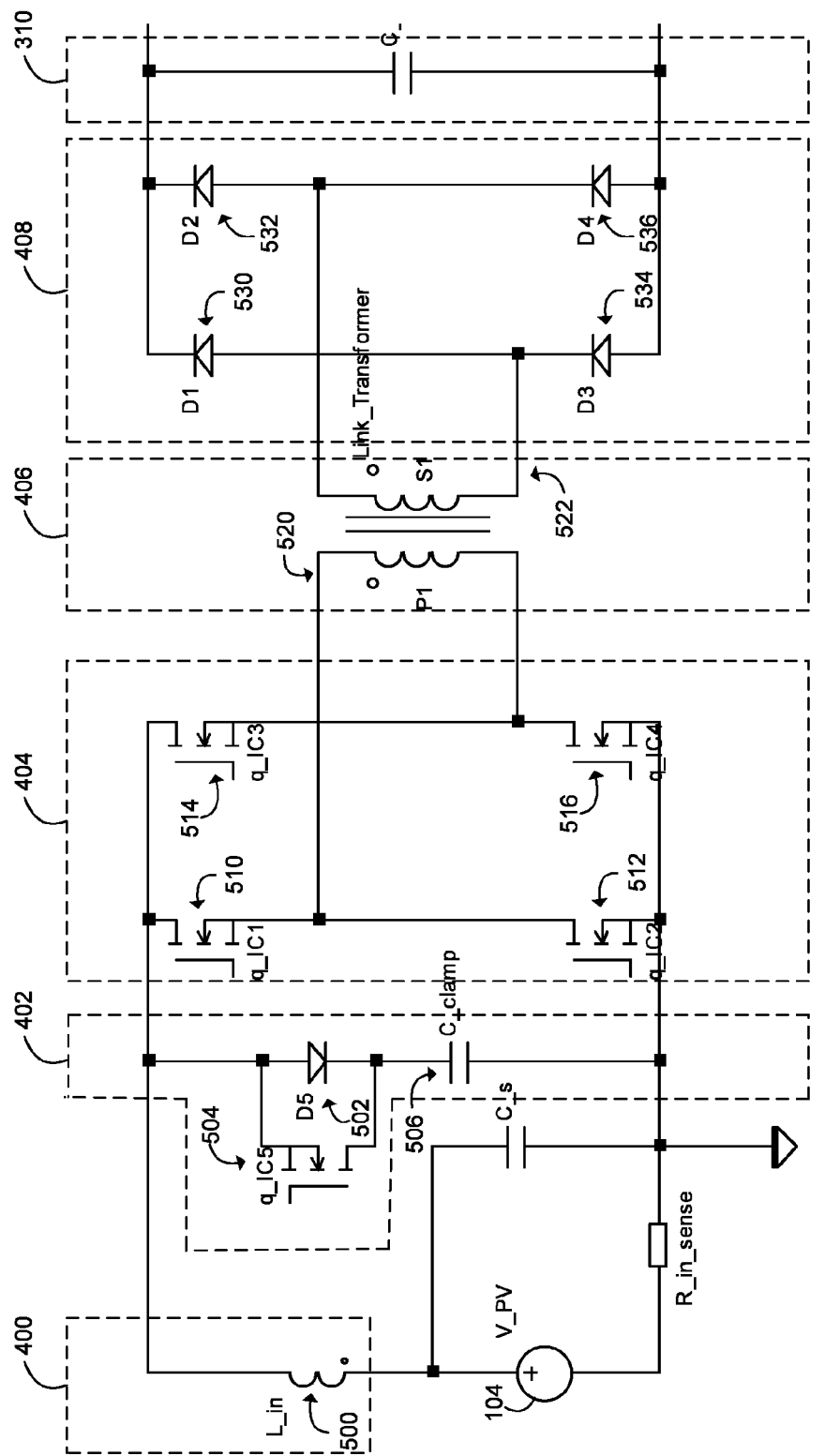
FIG. 5 is a simplified schematic of one embodiment of the input converter of FIG. 4.

Referring now to FIG. 5, one embodiment of the input converter 300 is shown. The illustrative input converter 300 is electrically coupled to the DC source 104, embodied as a photovoltaic cell, via the boost converter 400. In the illustrative embodiment, the boost converter 400 is an isolated boost converter embodied as an inductor 500. The voltage clamp 402 is embodied as an active voltage clamp and includes a diode 502, a switch 504 in parallel with the diode 502, a clamp capacitor 506. However, in other embodiments, a passive voltage clamp may be used. As discussed above, the voltage clamp 402 is operable to clamp the voltage of the inverter circuit 404 to a predetermined maximum voltage.

The inverter circuit 404 is illustratively embodied as a bridge circuit formed by a plurality of switches 510, 512, 514, 516. Each of the switches 510, 512, 514, 516 are configured to receive a corresponding control signal, $q_{IC1}$, $q_{IC2}$, $q_{IC3}$, $q_{IC4}$, from the input controller 302 to control operation of the inverter circuit 404. As discussed below, the input controller 302 uses PWM to control the switches 510, 512, 514, 516 at a relatively high switching frequency (e.g., at a frequency that is substantially higher than the AC grid frequency). As discussed above, the inverter circuit 404 converts the DC waveform from the DC source 104 to a first AC waveform based on the switching signals received from the input controller 302. In the illustrative embodiment, the inverter circuit 404 is embodied as a full-bridge circuit. However, in other embodiments, the inverter circuit 404 may utilize other circuit topologies such as a half-bridge circuit, a push-pull circuit, a flyback circuit, and/or other DC-DC converter circuits may be used in other embodiments. Additionally, although each of the switches 510, 512, 514, 516 is illustrated as MOSFET devices, other types of switches may be used in other embodiments.

The illustrative transformer 406 includes a primary winding 520 electrically coupled to the inverter circuit 404 and a secondary winding 522 electrically coupled to the rectifier circuit 408. The transformer 406 provides galvanic isolation between the primary side converter circuitry (including DC source 104) and the secondary side circuitry (including power bus 310), as well as between the controllers 302, 322. The turns ratio of the transformer 406 may also provide voltage and current transformation between the first AC waveform at the primary winding 520 and the second AC waveform at the secondary winding 522.

The rectifier circuit 408 is electrically coupled to the secondary winding 522 of the transformer 406 and is configured to convert the second AC waveform supplied by the transformer 406 to a DC bus waveform supplied to the power bus 310. In the illustrative embodiment, the rectifier 408 is embodied as a full-bridge rectifier formed from a plurality of diodes 530, 532, 534, 536. Again, in other embodiments, other circuit topologies may be used in the rectifier circuit 408.

The power bus 310 is also shown in FIG. 5. The power bus 310 illustratively includes a bus capacitor 550, which may be embodied as one or more individual capacitive devices. For example, the bus capacitor 550 may be embodied as one or more film capacitors, electrolytic capacitors, or other capacitive devices. Additionally, in the illustrative embodiment, the power bus 310 is a DC power bus and receives the DC bus waveform from the rectifier circuit 408.

Figure 6:
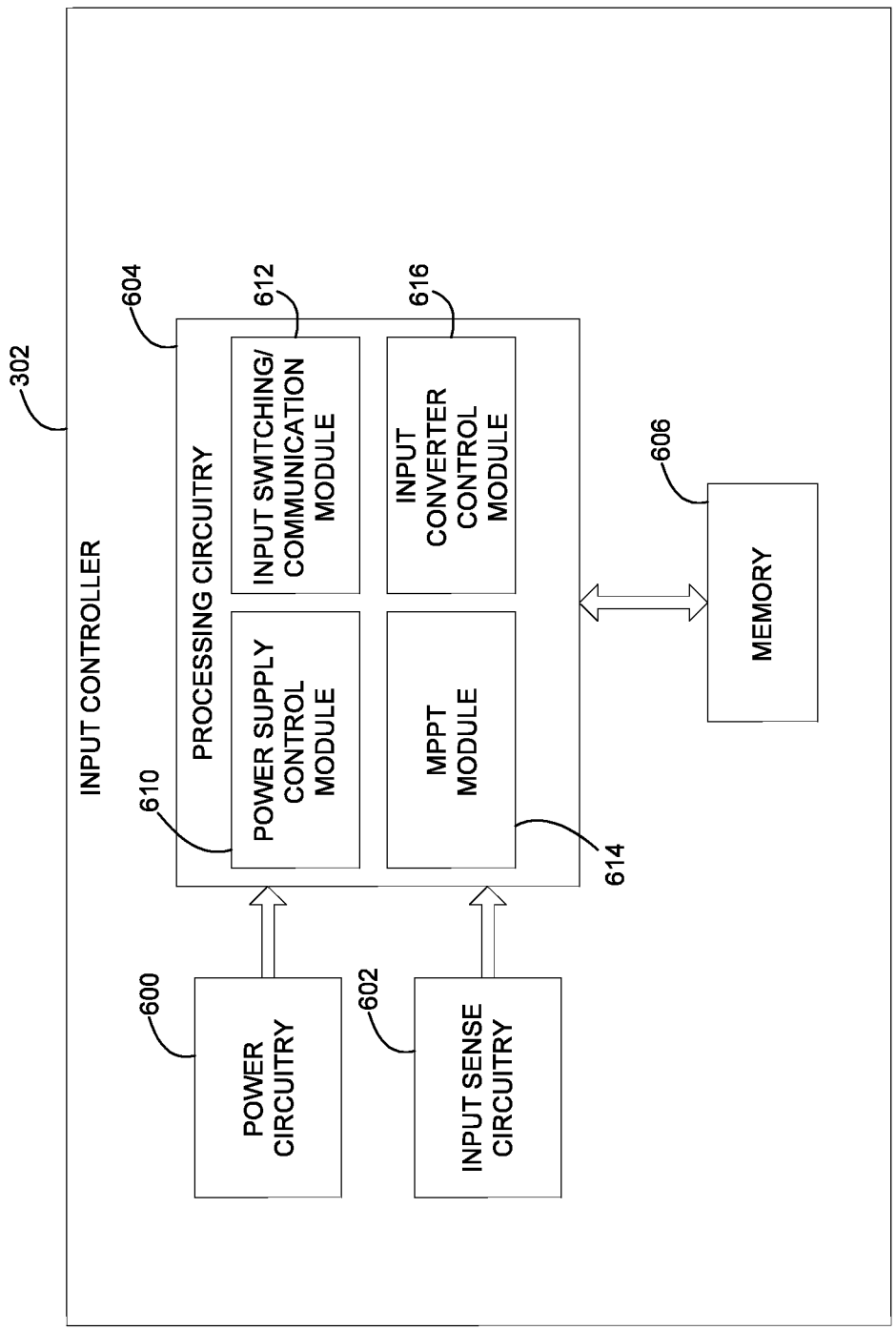
FIG. 6 is a simplified block diagram of one embodiment of an input controller of the inverter of FIG. 3.

Referring now to FIG. 6, one illustrative embodiment of the input controller 302 is shown. As discussed above, the input controller 302 controls the operation of the input converter 300. For example, the input controller 302 is configured to generate a plurality of switching signals to control the operation of the switches 510, 512, 514, 516 of the inverter circuit 404. Additionally, in embodiments wherein the voltage clamp 402 is embodied as an active voltage clamp, the input controller 302 generates one or more switching signals to control the operation of the voltage clamp switch 504.

The input controller 302 includes power circuitry 600, input sense circuitry 602, processing circuit 604, and memory 606. The input controller 302 includes an internal power supply embodied as the power circuitry 600. The power circuitry 600 provides power to the input controller 302 from the DC source 104. The power circuitry 600 may be embodied as any type of power supply circuitry. In the illustrative embodiment, the power circuitry 600 is embodied as a switching power supply powered by the DC source 104. For example, in one particular embodiment, the power circuitry 600 is embodied as step-down or "buck" DC-DC converter that receives power from the DC source 104 and generates the operating power for the various circuitry of the input controller 302. However, in other embodiments, other power supply circuits may be used such as, for example, a single-ended primary inductor converter (SEPIC). Of course, on initial power up, the input controller 302 may not be able to regulate its own power supply. As such, the power circuitry 600 may also include a start-up circuit to provide power from a linear regulator until the input controller 302 is fully "awake" and able to regulate its own power.

Figure 7A:
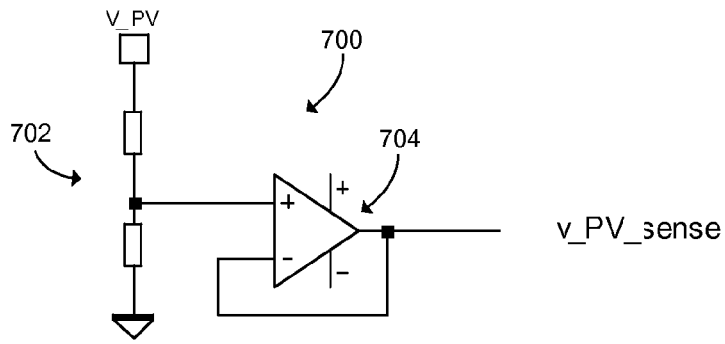
FIGS. 7a-7c are simplified schematics of embodiments of sensing circuits of the input controller of FIG. 6.
Figure 7B:
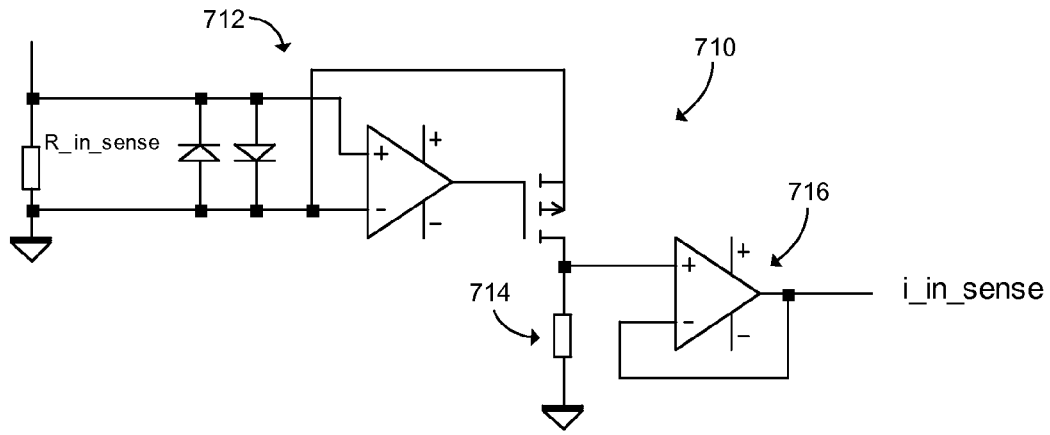
Figure 7C:
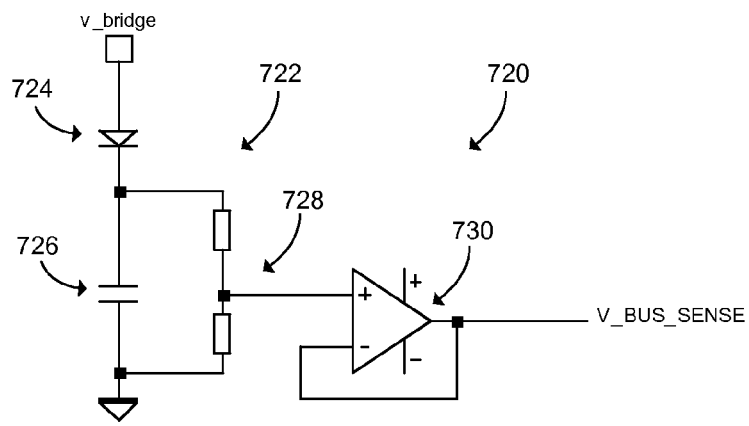

The input sense circuitry 602 includes a plurality of sensing circuits to sense various current and voltages of the inverter 106. In the illustrative embodiment, the input sense circuitry 602 is configured to sense the output voltage of the DC source 104, the output current of the DC source 104, and the voltage of the power bus 310. Of course, due to the isolation between the input converter 300 and the output converter 320, the sense circuitry 602 cannot directly sense or measure the voltage of the power bus 310. As such, the sense circuitry 602 is configured to sense indirectly the voltage of the power bus 310. Illustrative embodiments of the various sense circuits are illustrated in FIGS. 7a-7c. A voltage sense circuit 700 for sensing the output voltage of the DC source 104 is illustrated in FIG. 7a. The voltage sense circuit 700 includes a voltage divider circuit 702 electrically connected to an output of the DC source 104. The output of the voltage divider circuit 702 is received and buffered by a unity gain buffer amplifier 704.

A current sense circuit 710 for sensing the output current of the DC source 104 is illustrated in FIG. 7b. The current sense circuit 710 is coupled across the sense resistor, R_in_sense (see FIG. 5), and includes an operational transconductance amplifier 712. The amplifier 712 generates an output current through a load resistor 714 based on its differential input voltages. The output current of the amplifier 712 is proportional to the current through the sense resister, R_in_sense. A unity gain buffer amplifier 716 buffers the voltage across the load resistor 714 and generates a voltage magnitude proportional to the sensed current.

A bus voltage sense circuit 720 for indirectly sensing the voltage of the power bus 310 is illustrated in FIG. 7c. The bus voltage sense circuit 720 includes a peak detection circuit 722, which is coupled to the output of the input inverter circuit 404. The peak detection circuit 722 includes a peak detection diode 724 and a peak detection capacitor 726 in series with each other. The peak detection circuit 722 also includes a voltage divider circuit 728 coupled in parallel with the peak detection capacitor 726, which provides the appropriate filter response. An output of the voltage divider circuit 728 is received and buffered by a unity gain buffer amplifier 730. Each of the outputs of the sense circuits 700, 710, 720 are subsequently provided to an analog-to-digital converter (ADC) of the processing circuit 604. In some embodiments, the output of the input inverter circuit 404 may be sampled at specific points in time. For example, in one particular embodiment, the voltage of the power bus 310 is indirectly sensed by sampling the output of the input inverter circuit 404 only during those points in time when the diagonal pairs of switches 510, 516 and switches 512, 514 are in the on or conductive state.

Referring back FIG. 6, the processing circuit 604 may be embodied as any type of processing circuitry capable of performing the functions described herein. For example, the processing circuit 604 may be embodied as one or digital signal processors, microprocessors, microcontrollers, or the like. Such processors may have one or more processing cores. Similarly, the memory 606 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 606 is illustrated in FIG. 6, it should be appreciated that the input controller 302 may include additional memory devices in some embodiments.

The processing circuitry 604 includes a plurality of control modules, which may be embodied as firmware or software programs, discrete hardware circuitry, and/or a combination of hardware and software stored in, for example, the memory 606. In the illustrative embodiment, the processing circuitry 604 includes an internal power supply control module 610, an input switching frequency/communication module 612, an MPPT control module 614, and an input converter control module 616. Of course, it should be appreciated that additional or other modules, functionality, and features may be included in the processing circuitry 604 depending on the particular implementation.

The internal power supply control module 610 controls the functionality of the power circuitry 600, which provides power to the input controller 302. For example, in embodiments in which the power circuitry 600 is embodied as a switching power supply, the power supply control module 610 generates the switching signals for such switching power supply.

As discussed above, the input controller 302 and the output controller 322 may communicate with each other over the power bus 310 in some embodiments. In such embodiments, the input switching frequency/communication module 612 controls the switching frequency of the input converter 300 to modulate the voltage across the input transformer 406, which is subsequently carried across the power bus 310 to the output controller 322. Typically, the voltage across the transformer 406 has an average value with some small variations. However, by further modulating the voltage across the transformer 406, data can be communicated from the input controller 302 to the output controller 322. Such data may include, for example, the output voltage, current, and/or power of the DC power source 104, voltages and currents of components of the input converter 300, error signals, and/or other data from the input controller 302 or the input converter 300. In such embodiments, the use of direct communication (e.g., via a digital isolation channel) between the input controller 302 and the output controller 322 is not needed. One illustrative method for communicating across an isolation barrier is provided in U.S. patent application Ser. No. 12/832,199, entitled "Method for Communicating Across an Isolation Barrier in Power Converters," by Patrick Chapman, the entirety of which is incorporated herein by reference. Further, it should be appreciated that in other embodiments, the communication module 612 may be embodied as a wireless communication device configured to communicate with a corresponding communication module of the output controller 322. In such embodiments, the communication module 612 may utilize any suitable wireless communication technology such as, for example, Wi-Fi™, Zigbee®, WiMAX, Wireless USB, Bluetooth®, and/or other wireless communication technology and/or protocol.

The MPPT module 614 provides maximum power point tracking of the DC power source 104. Specifically, the MPPT module 614 monitors the power output of the DC power source 104 (e.g., a PV module) and generates a current command based on an MPPT algorithm. For example, as discussed above, photovoltaic cells have an operating point at which the values of the current and voltage of the cell result in an ideal or "maximum" power output, which is a function of environmental variables, including light intensity and temperature. As such, the MPPT module 614 attempts to maximize the power output of the DC source 104 during most operating conditions. Of course, it should be appreciated that under some operating conditions, such as at start-up or shut-down or during a rapid change in available sunlight, the MPPT module 614 and/or inverter 106 may actively or passively extract less than the maximum power from the DC source 104.

The input converter control module 616 controls the inverter circuit 404 and performs various voltage checks to ensure proper operation of the inverter 106. To do so, the input converter control module 616 generates a duty cycle command signal and a switching period command signal, which are loaded into associated pulse width modulation (PWM) circuitry to generate the switching signals that are supplied to the input inverter circuit 404. Additionally, as discussed in more detail below in regard to FIG. 12, the input converter control module 616 is configured to determine whether the output voltage of the DC source 104 and the voltage of the power bus 310 are within particular predetermined thresholds. Based on such determinations, the inverter 106 may be turned off and/or the output commands of the input converter control module 616 may be adjusted.

Figure 8:
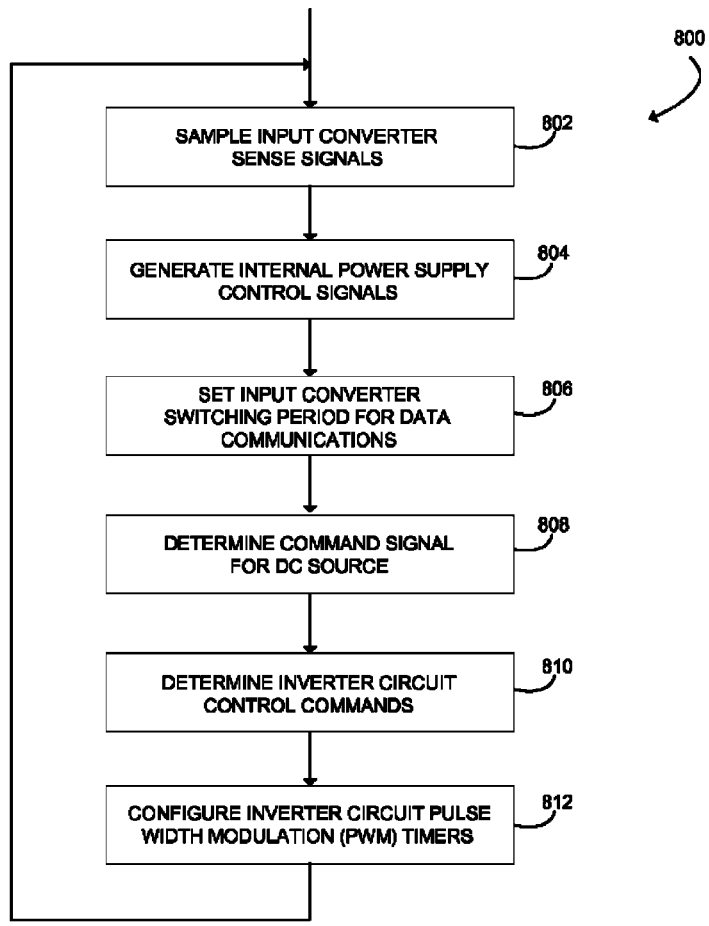
FIG. 8 is a simplified flowchart of one embodiment of a method for controlling an input converter that may be executed by the input controller of FIG. 6.

Referring now to FIG. 8, in use, the input controller 302 may execute a method 800 for controlling the input converter 300. The method 800 begins with block 802 in which the input controller 302 samples various signals of the input controller using the input sense circuitry 602. As discussed above, the output voltage and current of the DC power source 104 are sensed. Additionally, the bus voltage of the power bus 310 is indirectly sensed.

Figure 9:
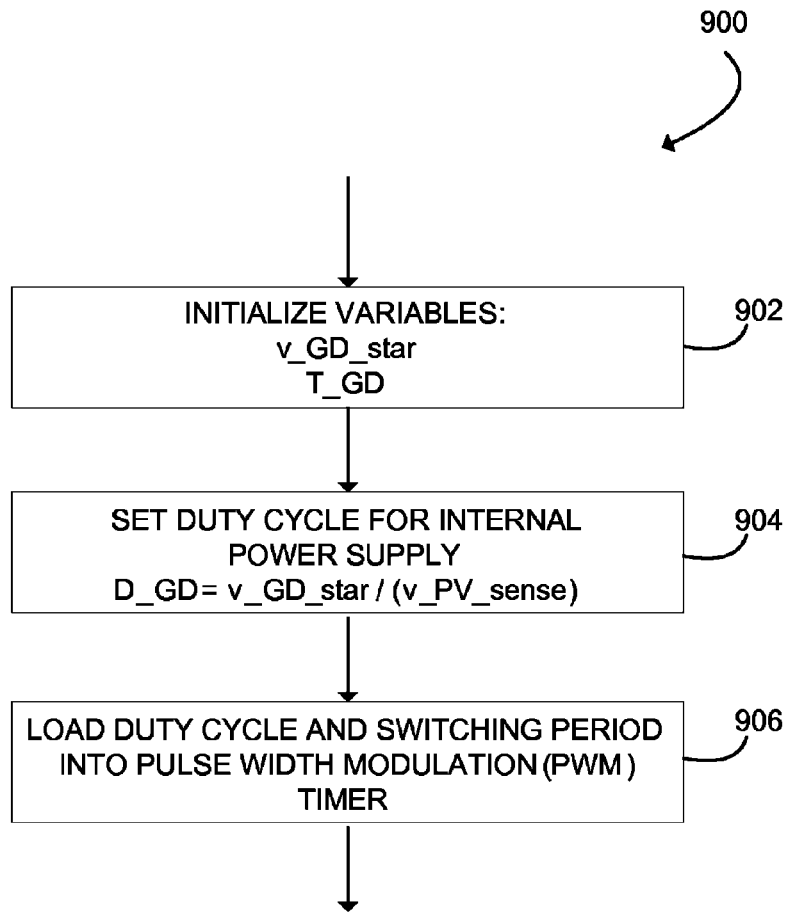
FIG. 9 is a simplified flow chart of one embodiment of a method for controlling a power supply of the input controller of FIG. 6.
Figure 10:
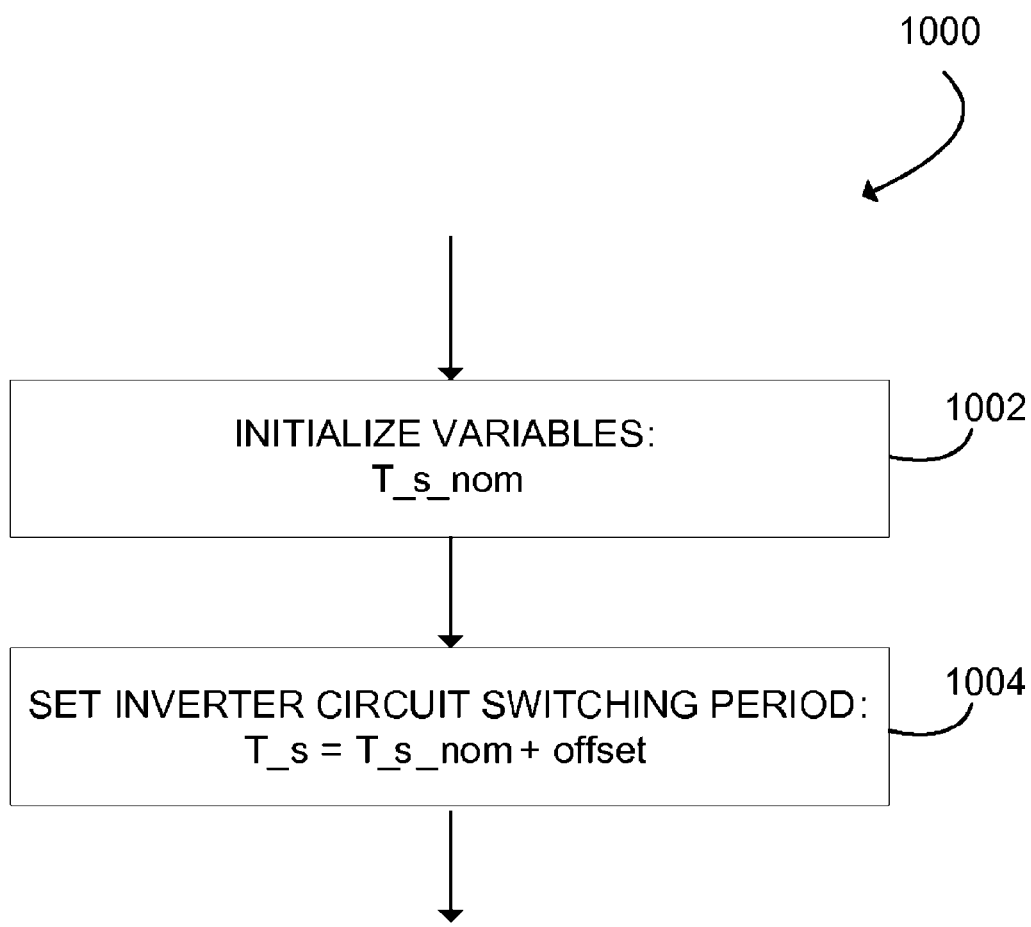
FIG. 10 is a simplified flow chart of one embodiment of a method for generating a switching period for the input converter of FIG. 4 that may be executed by the input controller of FIG. 6.

In block 804, the input controller 302 generates internal power supply control signals to the power circuitry 600. To do so, the input controller 302 may execute a method 900 for controlling the power supply circuitry 600 as shown in FIG. 9. The method 900 begins with block 902 in which data variables are initialized. In the illustrative embodiment, a gate-drive voltage command variable, V_GD_star, and a switching period variable, T_GD, are initialized. In the illustrative embodiment, the power circuitry 600 is configured to supply 9 volts for gate drive and about 3.3 volts for the sensing and control circuitry of the input controller 302. As such, the gate-drive voltage command variable, V_GD_star, is initially set to 9 volts. In block 904, the duty cycle, D_GD, for the power supply PWM timers is calculated. In the illustrative embodiment, the duty cycle is calculated based on the following equation:

$$D\_GD = V\_GD\_star / v\_PV\_sense$$

wherein D_GD is the requested duty cycle, V_GD_star is the gate-drive voltage command, and v_PV_sense is the sensed output voltage of the DC power source 104. Additionally, in some embodiments, the duty cycle, D_GD, may also include a feedback term to improve the control of the duty cycle. After the requested duty cycle has been calculated, the duty cycle and switching period are loaded into the power supply PWM timers to generate the switching signals for the power supply circuitry 600.

Referring back to FIG. 8, in block 806, the switching period of the input converter 300 is determined. As discussed in more detail above, the switching period of the input converter 300 may be adjusted so as to modulate the voltage of the transformer 406 to transmit data from the input controller 302 to the output controller 322. To do so, the input controller 302 may execute a method 1000 for generating a switching period. The method 1000 begins with block 1002 in which data variables are initialized. In the illustrative embodiment, a nominal switching period, T_s_nom, is initialized. The nominal switching period is the standard switching period of the input converter 300 when no data are being transmitted to the output controller 322.

Subsequently, in block 1004, the switching period of the input controller 302, T_s is set to the nominal switching period, T_s_nom, plus some predetermined offset amount. By adjusting the switching period in this manner, the voltage across the transformer 406 may be modulated to carry data to the output controller 322, which may then be sensed and demodulated by the output controller 322.

Figure 11:
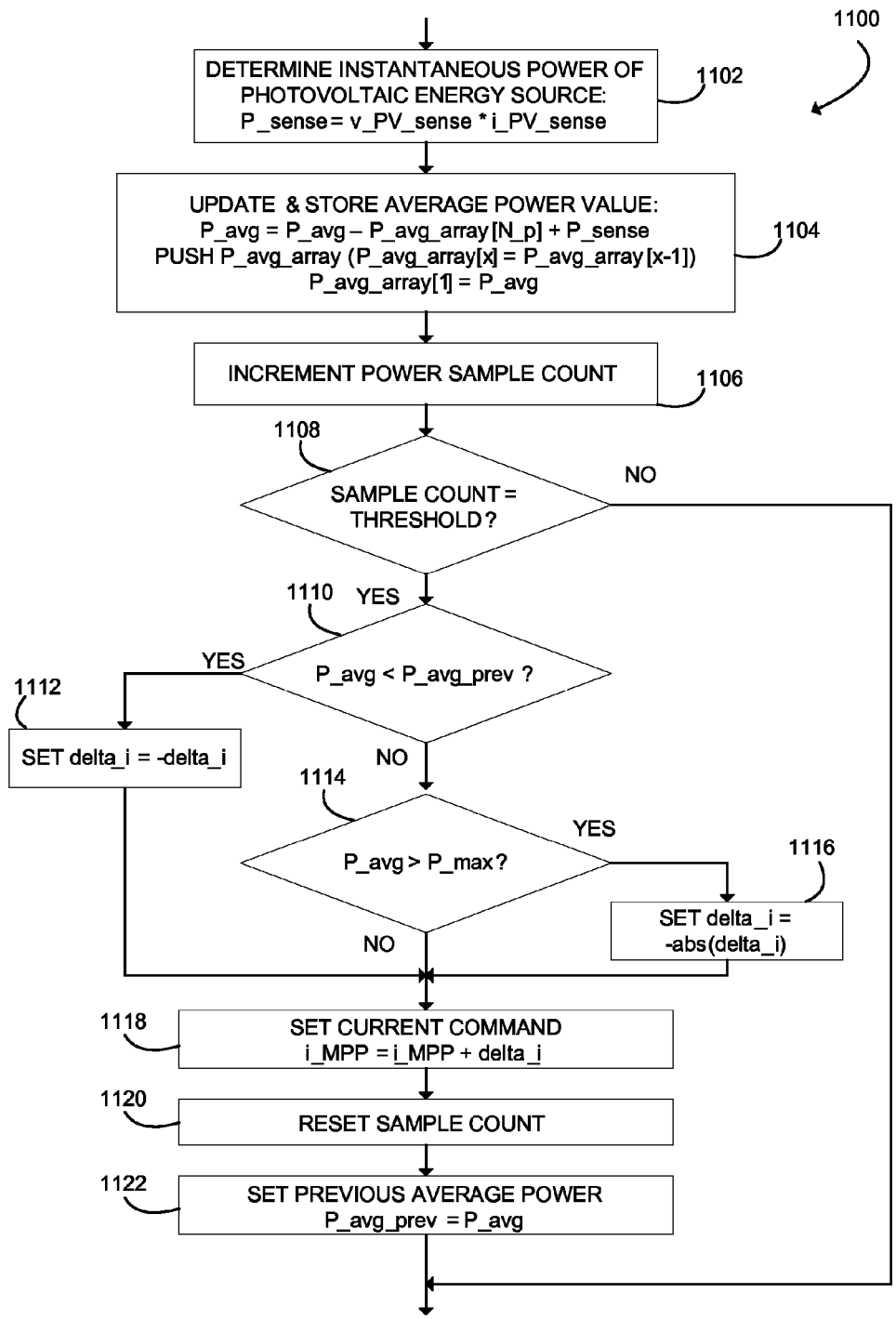
FIG. 11 is s simplified flowchart of one embodiment of a method for controlling a current command signal for an energy source that may be executed by the input controller of FIG. 6.

Referring back to FIG. 8, in block 808, a command signal for the DC source 104 (e.g., a photovoltaic energy source) is determined. The command signal may be embodied as a current command or a voltage command depending on the specific implementation. For example, in one embodiment as shown in FIG. 11, the input controller 302 executes an MPPT method 1100 to generate a current command for the DC source 104. The method 1100 begins with block 1102 in which the instantaneous power output of the DC source 104 is determined. The instantaneous power output of the DC source 104 may be determined by multiplying the sensed voltage and current of the DC source 104, which are generated by the input sense circuitry 602 as discussed above. In block 1104, a windowed average power value for the power of the DC source 104 is calculated. To do so, the oldest average power value is removed from the average window and the newly determined as shown in the pseudo-code of block 1104.

In block 1106, a sample count is incremented and, in block 1108, it is determined whether the sample count is equal to a predetermined threshold. If so, the method 1100 advances to block 1110 in which it is determined whether the currently calculated average power, P_avg, is less than the most previously calculated average power, P_avg_prev. If so, the method 1100 advances to block 1112 in which a requested change in the MPP current command, delta_i, is set to the negative value of the current requested change in MPP current command value. However, if the calculated average power, P_avg, is not less than the most previously calculated average power, P_avg_prev, the method 1100 advances to block 114 in which it is determined whether the calculated average power, P_avg, is greater than a predetermined maximum average power, P_max. If so, the method 1100 advances to block 1116 in which the requested change in MPP current command, delta_i, is set to the negative value of the absolute value of the current change in MPP current command value. Subsequently, in block 1118, the MPP current command, i_MPP, is set. Illustratively, the current command, i_MPP, is set to the sum of the current i_MPP value and the change in the current command value, delta_i. In block 1120, the sample count is reset to zero. Additionally, in block 1122 the previous average power variable, P_avg_prev, is set to the currently calculated average power, P_avg. In this way, the method 1100 determines a current command value, i_MPP, to achieve the maximum or near maximum power output of the DC source 104.

Figure 12:
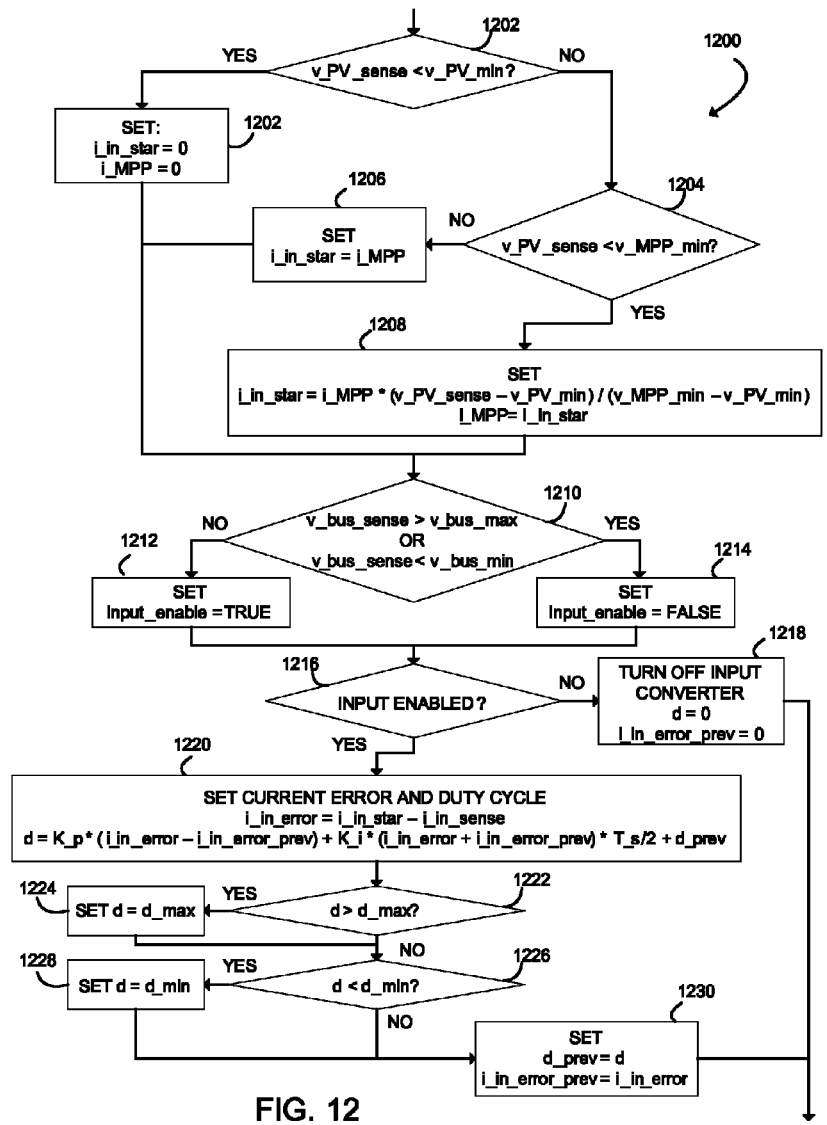
FIG. 12 is a simplified flow chart of one embodiment of a method for controlling the input converter of FIG. 4 that may be executed by the input controller of FIG. 6.

Referring back to FIG. 8, in block 810, the inverter circuit control commands are determined. To so, the input controller 302 may execute a method 1200 for a duty cycle of the input inverter circuit 404 as shown in FIG. 12. The method 1200 begins with block 1202 in which it is determined whether the sensed voltage of the DC source 104, v_PV_sense, is less than a predetermined minimum voltage, v_PV_min. If so, the method 1200 advances to block 1202 in which a current command, i_in_star, and the MPP current command, i_MPP, is set to zero. However, if the sensed voltage of the DC source 104, v_PV_sense, is not less than the predetermined minimum voltage, v_PV_min, the method 1200 advances to block 1202 in which it is determined whether the sensed voltage, v_PV_sense, is less than a predetermined minimum MPP voltage value, v_MPP_min. If not, the method 1200 advances to block 1206 in which the current command, i_in_star, is set to the MPP current command, i_MPP. However, if the sensed voltage, v_PV_sense, is not less than a predetermined minimum MPP voltage value, v_MPP_min, the method 1200 advances to block 1208 in which the current command, i_in_star is determined according to the following algorithm:

$$i\_in\_star = i\_MPP*(v\_PV\_sense - v\_PV\_min)/(v\_MPP\_min - v\_PV\_min)$$

wherein i_in_star is the current command, i_MPP is the MPP current command, v_PV_sense is the sensed voltage of the DC source 104, v_PV_min is the minimum DC source 104 voltage threshold, and v_MPP_min is the minimum MPP voltage threshold. Additionally, the MPP current command is set to zero in block 1208 after calculation of the current command, i_in_star.

In block 1210, it is determined whether the sensed bus voltage of the power bus 310 is outside a predetermined bus voltage maximum, v_bus_max, and bus voltage minimum, v_bus_min. If not, an inverter enable variable, input_enable, is set to TRUE in block 1212. However, if the sensed bus voltage falls outside the predetermined thresholds, the method 1200 advances to block 1214 in which the input enable variable, input_enable, is set to FALSE. Subsequently, in block 1216, it is determined whether the input converter has been enabled or disabled based on the state of the input enable variable, input enable. If the input enable variable has been set to FALSE, the inverter is turned off in block 1218 by setting the requested duty cycle, d, to zero in block 1218. Additionally, a previous current error variable, i_in_error_prev, is set to zero in block 1218. However, if the input enable variable has been set to TRUE, the method 1200 advances to block 1210 in which the current command error, i_in_error, and the requested duty cycle, d, are set. The current command error, i_in_error is set to the difference of the current command, i_in_star, and the sensed output current of the DC source 104, i_in_sense. Additionally, the duty cycle is calculated according to the following algorithm:

$$d = K\_p*(i\_in\_error - i\_in\_error\_prev) + K\_i*(i\_in\_error + i\_in\_error\_prev)*T\_s/2 + d\_prev$$

in which K_p and K_i are gain constants, i_in_error is the current command error, i_in_error_prev is the previous-most current command error, T_s is the switching period, and d_prev is the previous-most calculated duty cycle.

After the duty cycle, d, has been set in block 1220, the method 1200 advances to block 1222 in which it is determined whether the requested duty cycle, d, is greater than a predetermined maximum duty cycle, d_max. If so, the method 1200 advances to block 1224 in which the duty cycle, d, is set to a the predetermined maximum duty cycle, d_max. In block 1226, it is determined whether the duty cycle, d, is less than a minimum duty cycle, d_min. If so, the method 1200 advances to block 1228 in which the duty cycle, d, is set to the minimum duty cycle, d_min. Subsequently, in block 1230, the previous duty cycle variable, d_prev, is set to the current requested duty cycle, d, and the previous current error variable, i_in_error_prev, is set to the current error, i_in_error.

Figure 13:
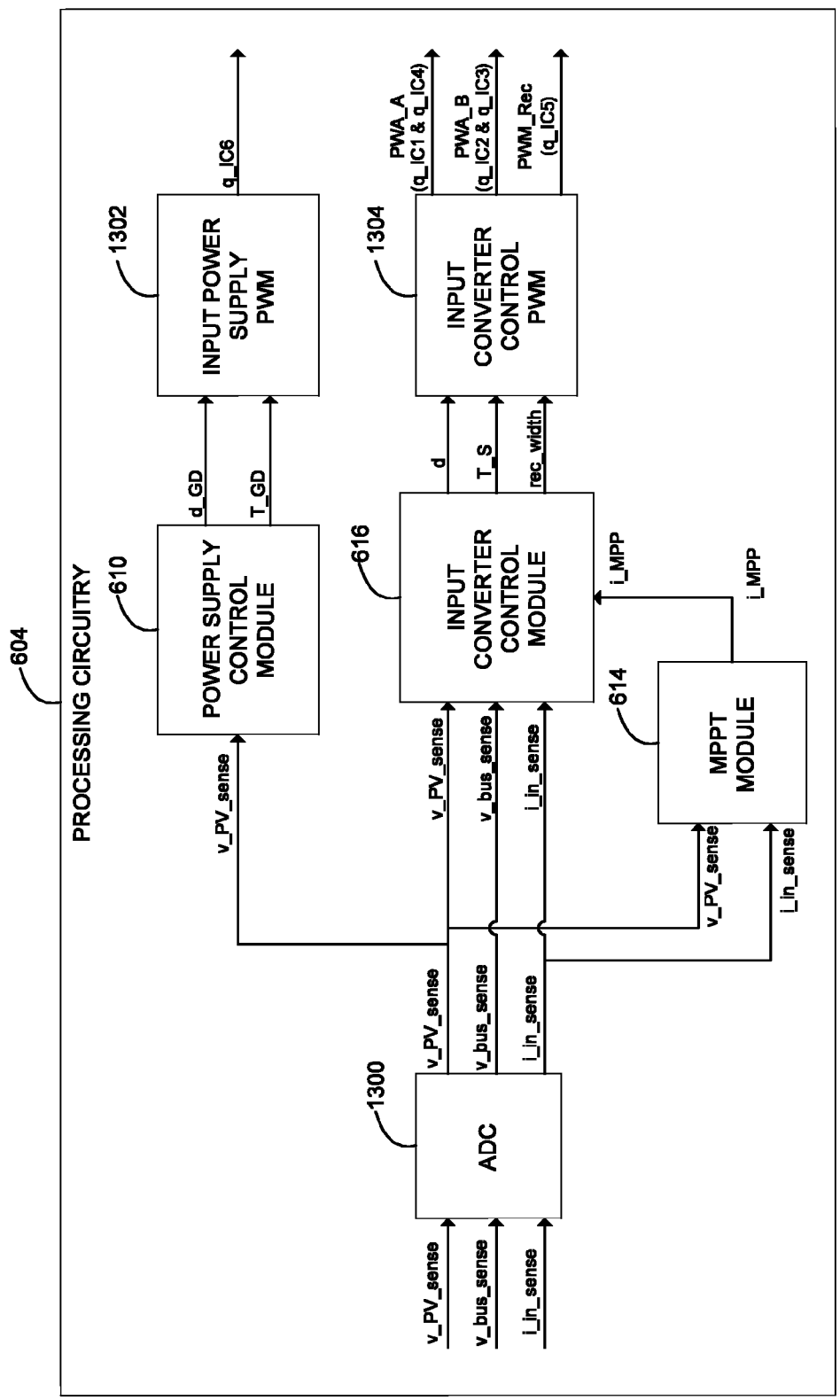
FIG. 13 is a simplified block diagram of one embodiment of the control modules of the input controller of FIG. 6.

Referring back to FIG. 8, after the duty cycle and switching periods have been determined, the method 800 advances to block 812 in which the pulse width modulation (PWM) timers of the processing circuitry 604 are loaded with the determined parameters. The PWM timers subsequently generate the switching signals for the inverter circuit 404. For example, one embodiment of the generation of such switching signals is illustrated in FIG. 13. As shown in FIG. 13, the processing circuitry 604 may include an analog-to-digital converter (ADC) 1300 configured to receive the sensed signals, v_PV_sense, v_bus_sense, and, i_in_sense, from the input sense circuitry 602. The DAC 1300 converts the sensed signals from analog signals to digital signals. The digital representation of the sensed voltage of the DC source 104, v_PV_sense, is provided to the power supply control module 610 of the processing circuitry 604. As discussed above, the power supply control module 610 generates a gate drive duty cycle, d_GD, and a gate drive switching period, T_GD, based on the sensed voltage of the DC source 104, v_PV_sense. The output signals of the power supply control module 610 are provided to an input power supply PWM module 1302, which generates the switching signal, q_IC6, for the power circuitry 600 as discussed above.

The digital representation of the sensed voltage and current of the DC source 104, v_PV_sense and i_in_sense, are provided to the MPPT module 614 of the processing circuitry 604. As discussed above, the MPPT module 614 generates an MPP current command, i_MPP, based on the sensed voltage and current signals. The MPP current command, i_MPP, and the digital representations of the sensed voltage and current of the DC source 104, v_PV_sense and i_in_sense, and the sensed bus voltage of the power bus 310 are provided to the input converter control module 616 of the processing circuitry 604. As discussed above, the input converter control module 616 generates a duty cycle, d, a switching period, T_S, and a clock pulse width command, rec_width, which may be simply assigned by the processing circuitry 604. The command signals generated by the input converter control module 616 are provided to an input converter control PWM module 1304, which generates the switching signals, $q_{IC1}$, $q_{IC2}$, $q_{IC3}$, $q_{IC4}$, to the inverter circuit 404 and the switching signal, $q_{IC5}$, to the active voltage clamp 402. Of course, as discussed above, the processing circuitry 604 may include additional or other modules in other embodiments based on, for example, the particular implementation.

Figure 14:
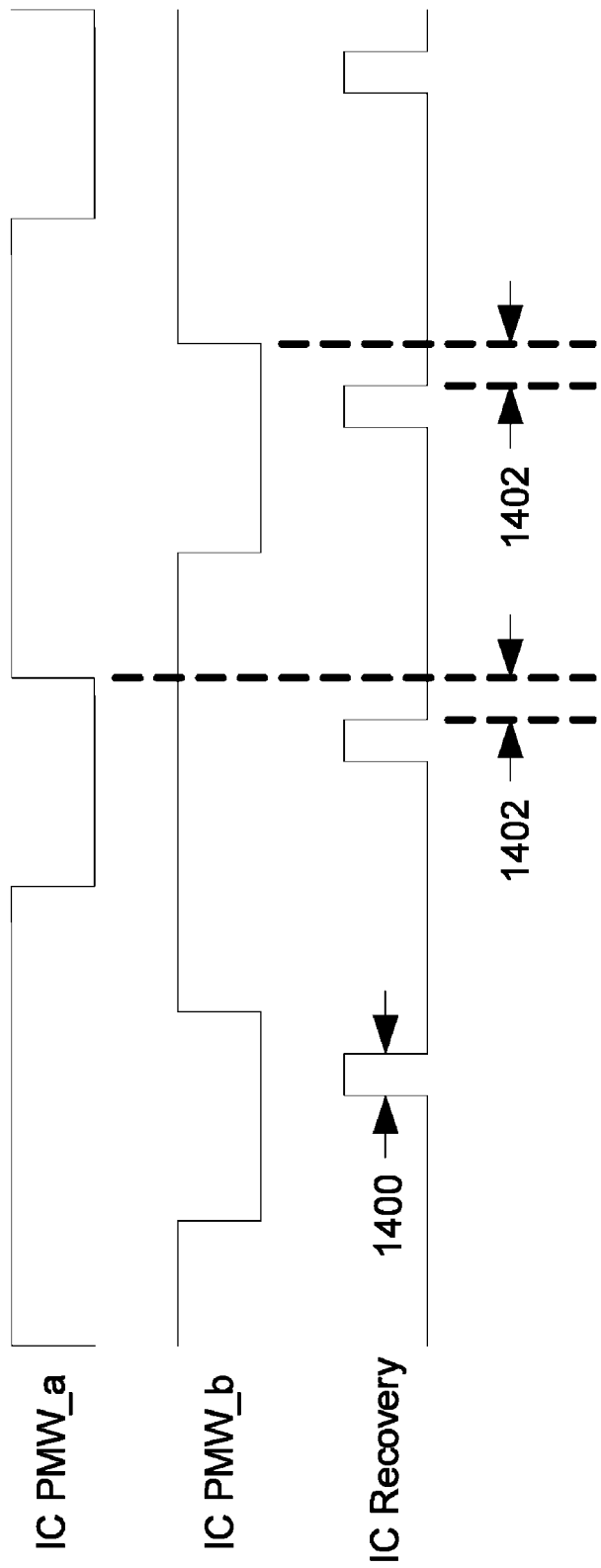
FIG. 14 is a simplified timing diagram of pulse width modulated switching signals generated by the input controller of FIG. 6.

Referring now to FIG. 14, a simplified timing diagram of the switching signals generated by the input converter control PWM module 1304 is shown. The pulse signal, IC PWM_a, provides the switching signals, $q_{IC1}$ and $q_{IC4}$, the pulse signal, IC PWM_b, provides the switching signals, $q_{IC2}$ and $q_{IC3}$, and the pulse signal, IC Recovery, provides the switching signal, $q_{IC5}$. As shown in FIG. 14, the recovery clock runs at twice the switching frequency, T_s. The width 1400 of the recovery clock pulse is equal to about 330 nanoseconds in implementations wherein the inverter 106 is intended for low voltage applications and to about 550 nanoseconds in implementation in which the inverter 106 is intended for high voltage applications. Additionally, the falling edge of the recovery clock has is shifted relative to the rising edge of the pulse signals, IC PWM_a and IC PWM_b, by a width 1402 of about 50 nanoseconds.

Figure 15:
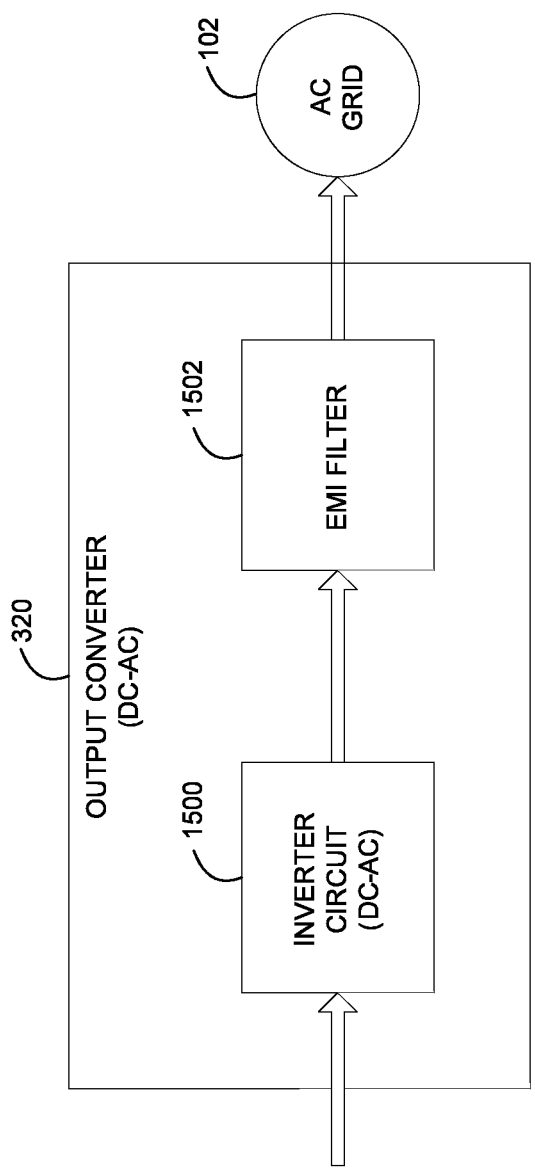
FIG. 15 is a simplified block diagram of one embodiment of an output converter of the inverter of FIG. 3.

Referring now to FIG. 15, in embodiments wherein the input converter 300 is embodied as a DC-to-DC converter, the output converter 320 may be embodied as a DC-to-AC converter. In such embodiments, the output converter 320 includes a DC-to-AC inverter circuit 1500 and an electromagnetic interference (EMI) filter 1502. The inverter circuit 1500 is electrically coupled to the power bus 310 and configured to convert the DC bus waveform to the output AC waveform, which is filtered by the EMI filter 1502.

Figure 16:
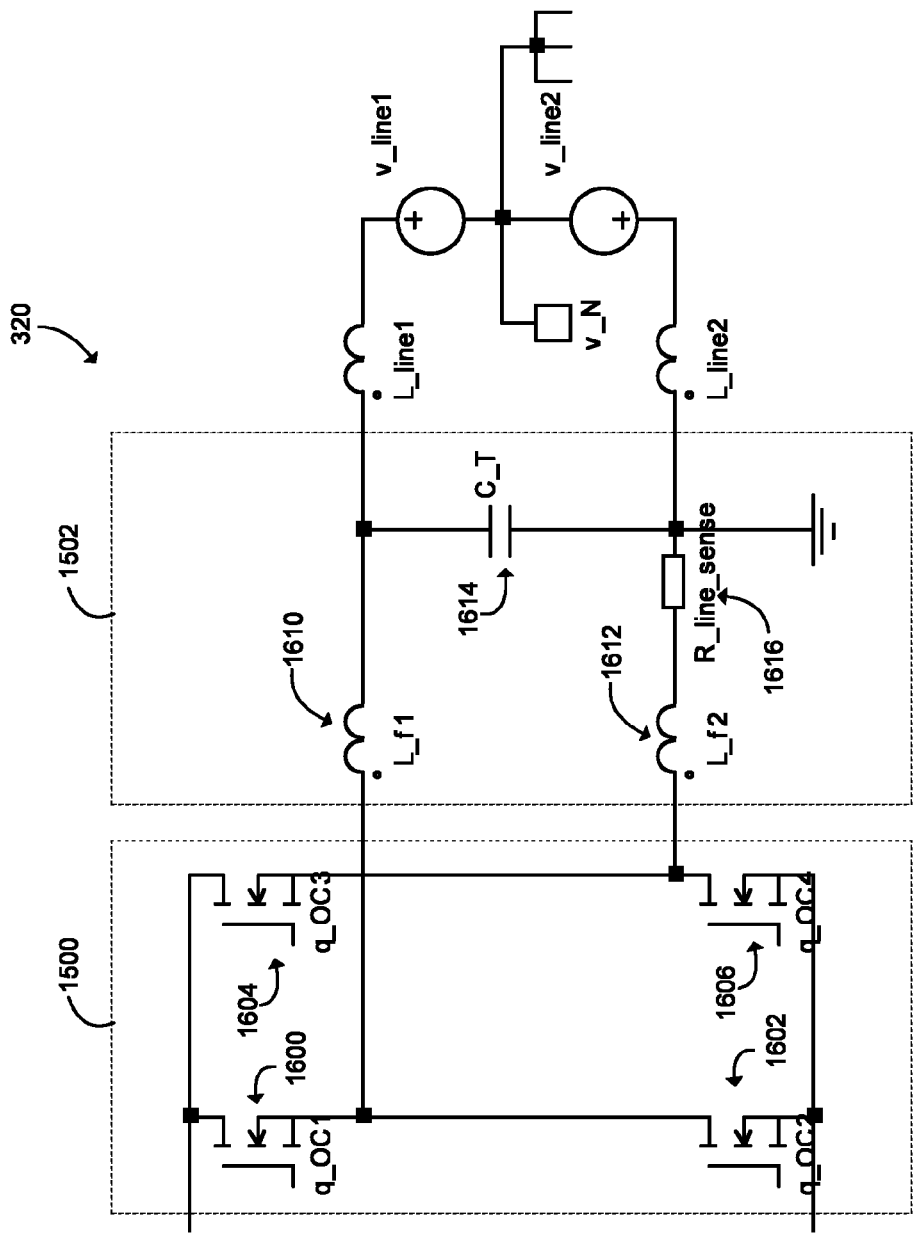
FIG. 16 is a simplified schematic of one embodiment of the output converter of FIG. 15.

One embodiment of the output converter 320 is illustrated in FIG. 16. As discussed above, the inverter circuit 1500 is configured to convert the DC bus waveform to the output AC waveform for delivery to the AC grid 102. The inverter circuit 1500 is illustrative embodied as a bridge circuit formed by a plurality of switches 1600, 1602, 1604, 1606. Each of the switches 1600, 1602, 1604, 1606 are configured to receive a corresponding control signal, $q_{OC1}$, $q_{OC2}$, $q_{OC3}$, $q_{OC4}$, from the output controller 322 to control operation of the inverter circuit 1500. As discussed below, the inverter circuit 1500 may use PWM to control the switches 1600, 1602, 1604, 1606 to generate a pulse width modulated AC waveform. Of course, it should be appreciated that although the illustrative the inverter circuit 1500 is a embodied as a full-bridge circuit, other circuit topologies such as a half-bridge circuit may be used in other embodiments.

The EMI filter 1502 is configured to filter the output voltage by reducing the conducted interference, reducing current ripple, and satisfying regulatory requirements. In the illustrative embodiment, the filter 1502 includes differential-mode inductors 1610, 1612 and a line filter capacitor 1614. The output converter 320 also includes an output current sense resistor 1616.

Figure 17:
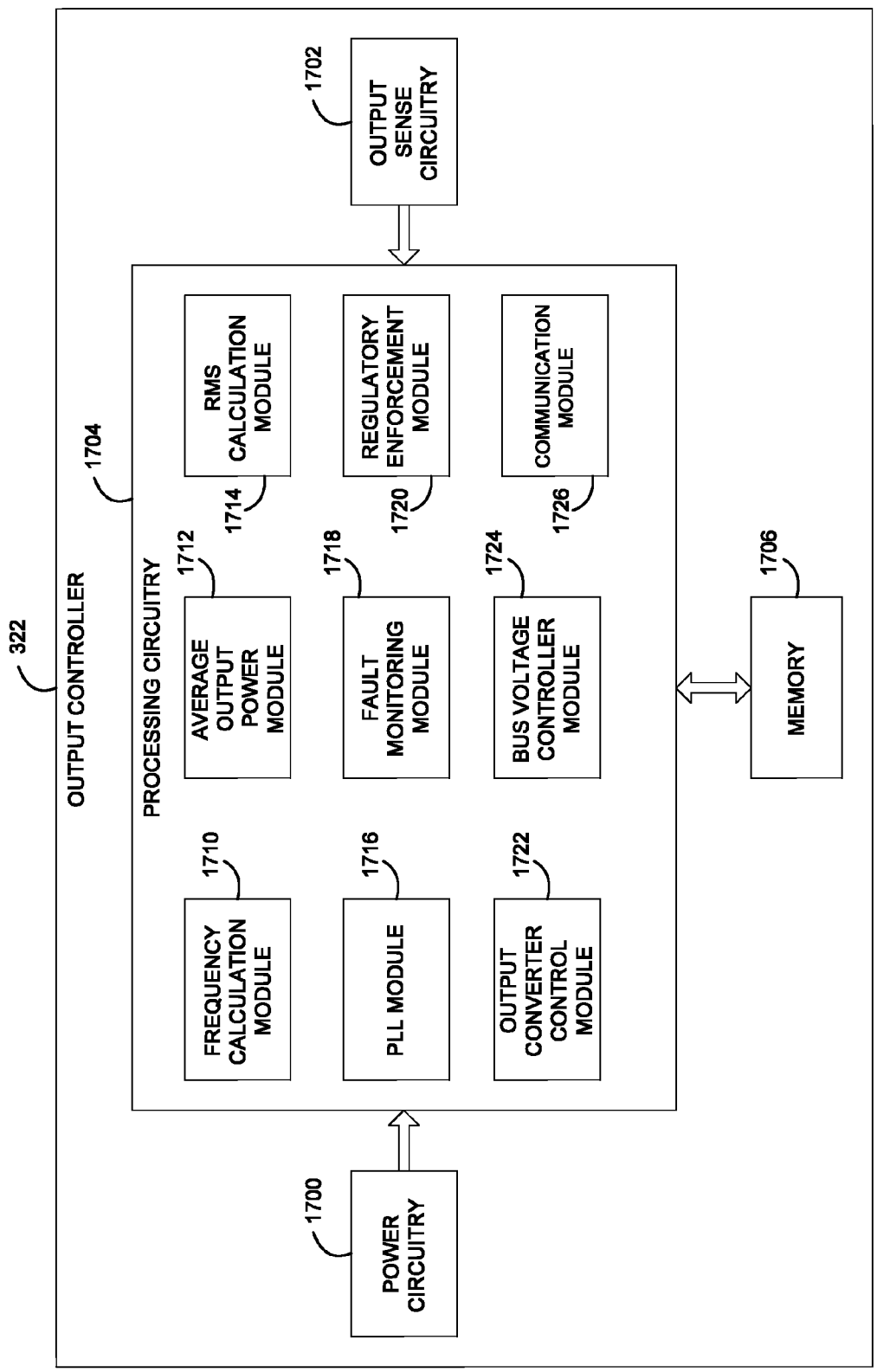
FIG. 17 is a simplified block diagram of one embodiment of an output controller of the inverter of FIG. 3.

Referring now to FIG. 17, one illustrative embodiment of the output controller 322 is shown. As discussed above, the output controller 322 controls the operation of the output converter 320. For example, the output controller 322 is configured to generate a plurality of switching signals to control the operation of the switches 1600, 1602, 1604, 1606 of the inverter circuit 1500. Illustratively, the output controller 322 includes power circuitry 1700, output sense circuitry 1702, processing circuitry 1704, and memory 1706. The power circuitry 1700 provides power to the output controller 322 from the AC grid 102. The power circuitry 1700 may be embodied as any type of power supply circuitry. For example, in some embodiments, the power circuitry 1700 may be embodied as a switching power supply similar to the power circuitry 600 of the input controller 302 described above.

Figure 18A:
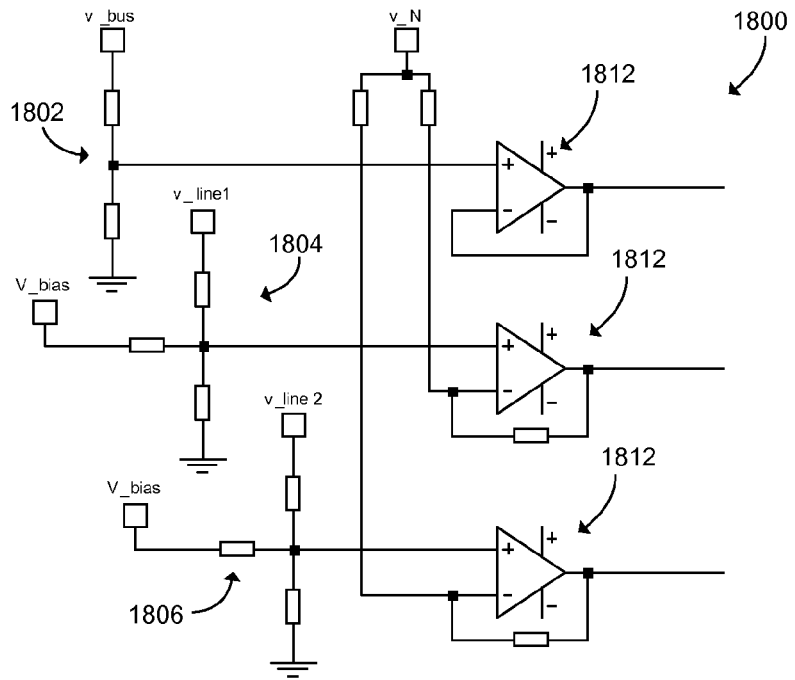
FIGS. 18a-18c are simplified schematics of embodiments of sensing circuits of the output controller of FIG. 17.
Figure 18B:
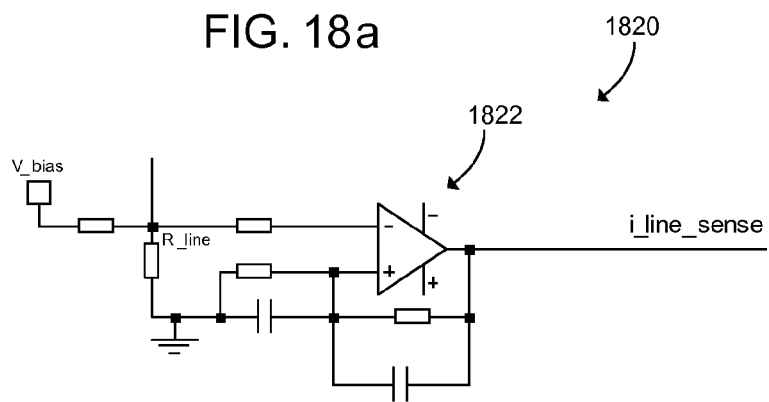
Figure 18C:
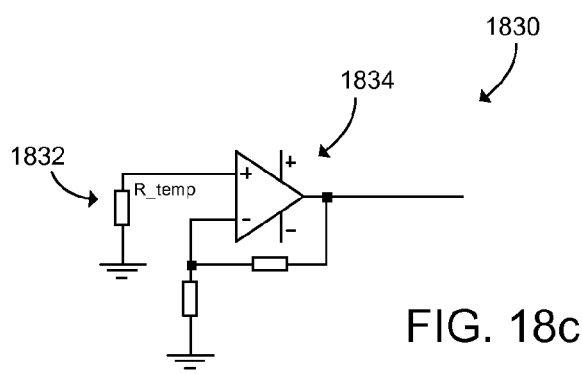
Figure 20:
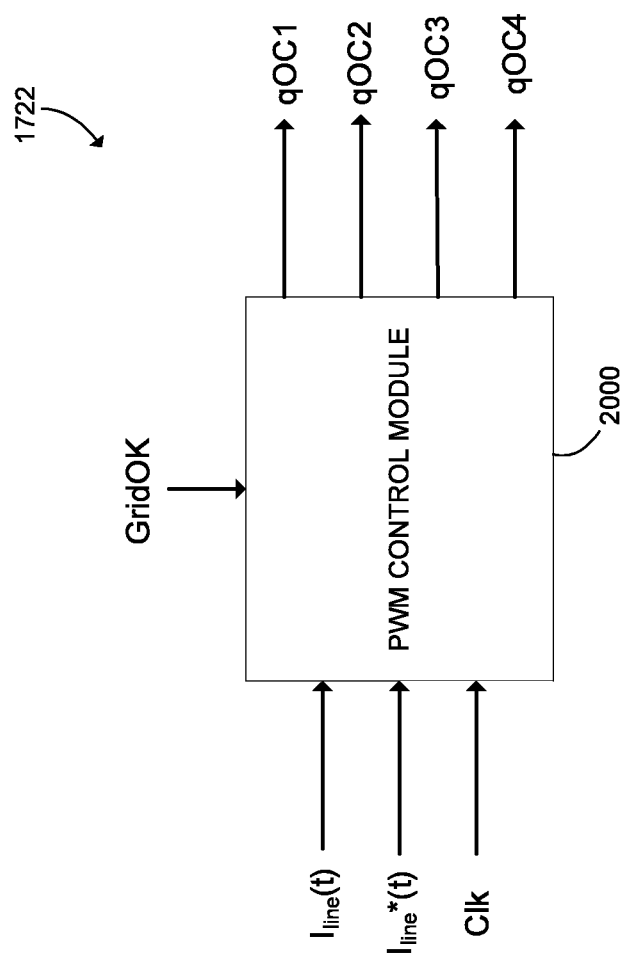
FIG. 20 is a simplified schematic of one embodiment of a pulse width modulated gate drive signals generator of the output controller of FIG. 17.

The output sense circuitry 1702 includes a plurality of sensing circuits to sense various current and voltages of the inverter 106. In the illustrative embodiment, the output sense circuitry 1702 is configured to sense the bus voltage of the power bus 310, the line voltages and current of the AC grid 102, and a temperature of the inverter 106. Illustrative embodiments of the various sense circuits are illustrated in FIGS. 18a-18c. A voltage sense circuit 1800 for sensing the bus voltage of the power bus 310 and the line voltages of the AC grid is illustrated in FIG. 18a. The voltage sense circuit 1800 includes a voltage divider circuit 1802 electrically connected to the input of the output inverter circuit 1500 to sense the bus voltage of the power bus 310, a voltage divider circuit 1804 electrically connected to one line of the AC grid 102 to sense the line voltage, and a voltage divider circuit 1806 electrically connected to another line of the AC grid 102 to sense the line voltage. Each of the outputs of the voltage divider circuits 1802, 1804, 1806 are provided to a corresponding buffer amplifier, 1812, 1814, 1816. Additionally, the buffer amplifiers 1814, 1816 are offset to produce a strictly positive output.

A current sense circuit 1820 for sensing the output current of the inverter 106 is illustrated in FIG. 18b. The current sense circuit 1820 is coupled across the output current sense resistor 1616, and includes a buffer amplifier 1822. Additionally, a temperature sense circuit 1830 for sensing a temperature of the inverter 106 is illustrated in FIG. 18c. The temperature sense circuit 1830 is coupled across a temperature sensor 1832 and includes a buffer amplifier 1824.

Referring back FIG. 17, the processing circuit 1704 may be embodied as any type of processing circuitry capable of performing the functions described herein. For example, the processing circuit 1704 may be embodied as one or digital signal processors, microprocessors, microcontrollers, or the like. Such processors may have one or more processing cores. Similarly, the memory 1706 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 1706 is illustrated in FIG. 17, it should be appreciated that the output controller 322 may include additional memory devices in some embodiments.

The processing circuitry 1704 includes a plurality of control modules, which may be embodied as firmware or software programs, discrete hardware circuitry including both digital and analog circuitry (e.g., comparators, operational amplifiers, etc.), and/or a combination of hardware and software stored in, for example, the memory 1706. In the illustrative embodiment, the processing circuitry 1704 includes a frequency calculation module 1710, an average output power module 1712, an RMS calculation module 1714, a phase-lock-loop (PLL) module 1716, a fault monitoring module 1718, a regulatory enforcement module 1720, an output converter control module 1722, a bus voltage controller module 1724, and a demodulation communication module 1726.

The frequency calculation module 1710 is configured to determine the frequency of the AC grid 102. To do so, the frequency calculation module 1710 may receive an output of the PLL module 1716, which is configured to lock onto the frequency of the AC grid 102. The average output power module 1712 and the RMS calculation module 1714 are configured to determine parameters of the output power of the inverter 106. Specifically, the average output power module 1712 determines the average output power of the inverter 106 and the RMS calculation module 1714 determines the RMS output power of the inverter 106 based on the sensed output voltage and current values of the inverter 106. The fault monitoring module 1718 monitors the operations of the inverter 106 for faults. For example, the fault monitoring module 1718 ensures that the parameters of the inverter 106 are within predefined thresholds. Additionally, the fault monitoring module 1718 may include island detection functionality, overheating detection (e.g., via use of the temperature sensor 1832), and/or the like.

The regulatory enforcement module 1720 ensures the inverter 106 is operating within the parameters defined by particular power regulatory guidelines. One embodiment of the regulatory enforcement module 1720 is illustrated in FIG. 19. The regulatory enforcement module 1720 receives various parameter signals of the inverter 106 and generates an output converter enable signal, GridOK, based on whether the parameter signals fall within a predefined limit. In the illustrative embodiment, the regulatory enforcement module 1720 implements the regulatory specifications outlined in the *IEEE* 1547 *Standard for Interconnecting Distributed Resources with Electric Power Systems* (2003), but may implement additional or other regulatory specifications in other embodiments. As shown in FIG. 19, the regulatory enforcement module 1720 receives an average output voltage signal of the inverter 106, $V_{RMS}$, and an output line frequency signal, $f_{line}$. The regulatory enforcement module 1720 compares the parameter signals to various thresholds and, if the parameter signals exceed any one threshold, initiates a time window of varying length based on the particular threshold. If the parameter signal continues to exceed the particular threshold for the duration of the time window, the regulatory enforcement module 1720 determines that the inverter 106 is operating outside of the regulatory specification and turns the output of the inverter 106 off by setting the output converter enable signal, GridOK, to FALSE. The regulatory enforcement module 1720 may then recheck the parameter signals after some period of time (e.g., five minutes) and assert the output converter enable signal, GridOK, if the parameter signals fall within the regulator specification. Again, as discussed above, the regulatory enforcement module 1720 may implement additional or other regulatory specifications in other embodiments.

Referring now back to FIG. 17, the output converter control module 1722 controls the operation of the inverter circuit 1500. To do so, the output converter control module 1722 generates switching signals to the switches 1600, 1602, 1604, 1606 of the inverter circuit 1500. In the illustrative embodiment, the output converter control module 1722 is embodied as a PWM control module 2000. The PWM control module 2000 receives a measured output current signal, $I_{line}(t)$, of the output converter 322 and an output current command signal, $I_{line}*(t)$. The PWM control module 2000 also receives a clock input signal, Clk, and the output converter enable signal, GridOK. If the output converter enable signal, GridOK, is asserted, the PWM control module 2000 is configured to determine an error correction based on the measured output current signal, $I_{line}(t)$, and the output current command signal, $I_{line}*(t)$, and generate the PWM switching signals, qOC1, qOC2, qOC3, and qOC4, based thereon. To do so, the PWM control module 2000 may be configured to use any suitable PWM technique including, for example, hysteresis PWM, average current mode PWM, or other PWM technique. It should be appreciated that in such embodiments the PWM control module 2000 may receive additional or other inputs (e.g., line frequency, power bus voltage, etc.) depending upon the particular PWM technique used. One PWM technique that may be used by the PWM control module 2000 is described in described in U.S. patent application Ser. No. 12/960,208, entitled "Variable Duty Cycle Switching with Imposed Delay" by Alex Gray et al., the entirety of which is incorporated herein by reference.

Figure 21:
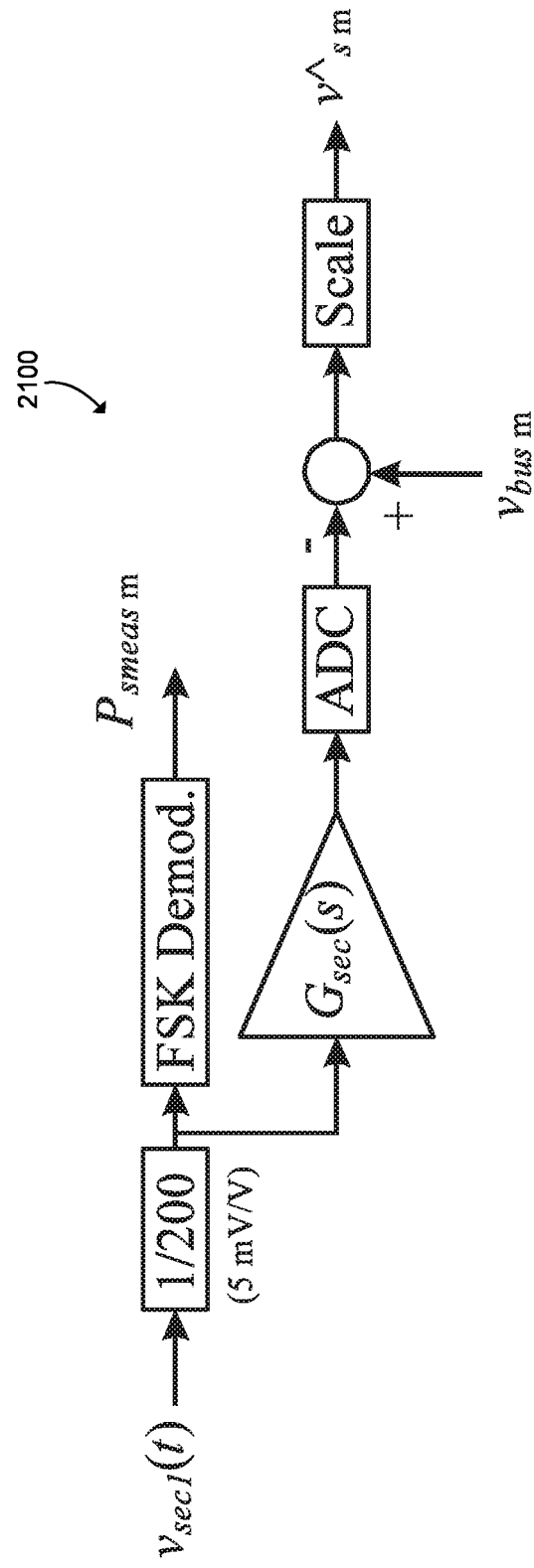
FIG. 21 is a simplified block diagram of one embodiment of a communication logic circuit of the output controller of FIG. 17.

Referring back to FIG. 17, the communication module 1726 is configured to communicate with the communication module 612 of the input controller 302. In embodiments in which the communication module 612 is configured to transmit data across the power bus 310, the communication module 1726 is configured to demodulate the voltage received across the secondary of the transformer 406 to extract any data sent by the input controller 302. By sensing the secondary voltage of the transformer 406, the frequency pattern can be determined and used to decode any data sent by the input controller 302. One illustrative communication logic circuit 2100 is illustrated in FIG. 21. The communication circuit 2100 senses the secondary voltage of the transformer 406 and applies a frequency shift key (FSK) algorithm to retrieve the modulated data. Additionally, in some embodiments, the communication circuit 2100 may also measure the average voltage across the input rectifier 408. The average voltage may then be subtracted from the bus voltage of the power bus 310 to produce an estimate of the DC power source 104. Of course, it should be appreciated that other logic circuits may be used in other embodiments to demodulate the voltage signal to retrieve the transmitted data. Additionally, in those embodiments in which the communication module 612 of the input controller 302 is configured wirelessly transmit data, the communication module 1726 is configured to receive such wireless data.

Referring back to FIG. 17, it should be appreciated that only illustrative control modules and functionality of the output controller 322 have been illustrated and described for clarity of the description. However, it should be appreciated that in other embodiments, the output controller 322 may include additional or other modules, functionality, and features for controlling the operation of the output converter 320 and the inverter 106.

Certain embodiments of the present disclosure have been described. Nevertheless, it will be understood that various modifications may be made without departing from the spirit and scope of the disclosure. For example, any of a wide variety of known non-resonant and resonant switching power converter topologies may be used in place of the specific converter embodiments described herein. The unipolar input source may be a fuel cell or another kind of DC source. The inverter controller may comprise elements for regulatory and safety monitoring and control (e.g., circuits or processes for disabling the inverter in the event of AC grid fault or input source fault, islanding protection). Switches in power converters are shown to be MOSFETs and to comprise diodes across their terminals. It is understood that other types of switches may be used (e.g., bipolar transistors, IGBTs) and that diodes may be intrinsic to the semiconductor switch or may be discrete devices. Switches may also be provided with passive or active snubbers to prevent losses and/or to limit voltage or current stresses.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An inverter for converting direct current (DC) power from a DC power source to alternating current (AC), the inverter comprising:
    an input converter having an input converter output;
    a power bus electrically coupled to the input converter output;
    an output converter electrically coupled to the power bus;
    an input controller configured to control operation of the input converter, the input controller comprising a voltage sense circuit electrically coupled to the input converter output and configured to generate a signal indicative of the voltage of the power bus,
    wherein the input controller is configured to control the operation of the input converter based, at least in part, on the signal indicative of the voltage of the power bus.

2. The inverter of claim 1, further comprising an output controller configured to control operation of the output converter, wherein the output controller is galvanically isolated from the input controller.

3. The inverter of claim 2, wherein the input controller is incapable of directly communication with the output controller.

4. The inverter of claim 2, wherein the input controller is further configured to control the operation of the input converter to communicate data to the output controller over the power bus.

5. The inverter of claim 4, wherein the input controller and the output controller are configured to communicate with each other only over the power bus.

6. The inverter of claim 2, wherein the output controller includes a first communication circuit and the input controller includes a second communication circuit configured to communicate with the first communication circuit over the power bus based on control of the input converter by the input controller.

7. The inverter of claim 2, wherein the voltage sense circuit of the input controller comprises a first voltage sense circuit configured to generate a first signal indicative of the voltage of the power bus, and
    wherein the output controller comprises a second voltage sense circuit electrically coupled to the power bus to generate a second signal indicative of the voltage of the power bus.

8. The inverter of claim 1, wherein the input converter is coupled to the DC power source to receive a DC input waveform and wherein the input controller is configured to control operation of the input converter to convert the DC input waveform to a bus waveform supplied to the power bus.

9. The inverter of claim 8, wherein the DC power source comprises a photovoltaic (PV) module.

10. The inverter of claim 7, wherein the bus waveform is a DC bus waveform, and the output converter is configured to convert the DC bus waveform to an AC output waveform.

11. A method for controlling operation of a direct current (DC)-to-alternating current (AC) inverter, the method comprising:
    detecting, by a voltage sense circuit of an input controller of the DC-to-AC inverter, a voltage of an inverter circuit of an input converter of the DC-to-AC inverter;
    generating, by the voltage sense circuit, a signal indicative of a voltage of a power bus of the inverter, wherein the power bus is electrically coupled to the input converter and an output converter of the DC-to-AC inverter; and
    controlling, by the input controller, operation of the input converter based, at least in part, on the signal to communicate with the output controller over the power bus.

12. The method of claim 11, further comprising controlling, by an output controller of the DC-to-AC inverter, operation of an output converter of the DC-to-AC inverter, wherein the output converter is electrically coupled to the power bus and galvanically isolated from the input controller.

13. The method of claim 12, wherein controlling operation of the input converter comprises controlling, by the input controller, operation of the input converter without directly communicating, by the input controller, with the output controller.

14. The method of claim 12, further comprising communicating, by the input controller, with the output controller over the power bus.

15. The method of claim 14, wherein communicating with the output controller comprises communicating, by the input controller, with the output controller only over the power bus.

16. The method of claim 14, wherein communicating with the output controller comprises controlling, by the input controller, the operation of the input converter to communicate with the output controller over the power bus.

17. The method of claim 12, further comprising sensing, by a voltage sense circuit of the output controller, a voltage of the power bus.

18. The method of claim 11, further comprising:
receiving, by the input converter, a DC input waveform from a DC power source,
wherein controlling the operation of the input converter comprises controlling, by the input controller, operation of the input converter to convert the DC input waveform to a power bus waveform supplied to the power bus.

19. The method of claim 18, wherein receiving the DC input waveform comprises receiving a DC input waveform from a photovoltaic (PV) module.

20. The method of claim 19, wherein controlling the operation of the input converter comprises controlling, by the input controller, operation of the input converter to convert the DC input waveform to a DC power bus waveform supplied to the power bus, and
further comprising controlling, by an output controller of the DC-to-AC inverter, operation of an output converter of the DC-to-AC inverter to convert the DC power bus waveform to an AC output waveform.

* * * * *